US011079865B2

(12) United States Patent
Kobori

(10) Patent No.: US 11,079,865 B2
(45) Date of Patent: Aug. 3, 2021

(54) POSITION DETECTION DEVICE AND CONTROL METHOD FOR POSITION DETECTION SENSOR

(71) Applicant: Wacom Co., Ltd., Saitama (JP)

(72) Inventor: Takeshi Kobori, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 75 days.

(21) Appl. No.: 15/611,373

(22) Filed: Jun. 1, 2017

(65) Prior Publication Data

US 2017/0371434 A1    Dec. 28, 2017

(30) Foreign Application Priority Data

Jun. 24, 2016  (JP) .............................. JP2016-125143

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/046* (2013.01); *G06F 1/1607* (2013.01); *G06F 2200/1632* (2013.01)

(58) Field of Classification Search
CPC .... G06F 3/03545; G06F 3/0383; G06F 3/046; G06F 2200/1632; G06F 1/1607; G01D 5/22; G01D 5/225; G01D 5/2066
See application file for complete search history.

(56) References Cited

U.S. PATENT DOCUMENTS 5,750,939 A * 5/1998 Makinwa ................ G06F 3/046
                                              178/18.01
6,518,957 B1 * 2/2003 Lehtinen ............... G06F 1/1626
                                                  345/173
(Continued)

FOREIGN PATENT DOCUMENTS

JP   5-275283 A   10/1993
JP   10-13893 A    1/1998
(Continued)

OTHER PUBLICATIONS

Extended European Search Report, dated Dec. 22, 2020, for European Application No. 17 177 083.1, 4 pages.

*Primary Examiner* — Patrick N Edouard
*Assistant Examiner* — Douglas M Wilson
(74) *Attorney, Agent, or Firm* — Seed IP Law Group LLP

(57) ABSTRACT

A position detection device includes an accommodation portion, a planar coil, a first control circuit, and a first detection circuit. The accommodation portion accommodates therein an electronic pen having a position indication coil wound in an axial direction of the electronic pen. The planar coil is disposed adjacent to the accommodation portion at a position at which a center axis direction of the planar coil crosses the axial direction of the electronic pen while the electronic pen is accommodated in the accommodation portion. The first control circuit performs control such that supply of a signal to the planar coil and reception of a signal through the planar coil by electromagnetic induction are performed alternately. The first detection circuit detects a state regarding accommodation of the electronic pen in the accommodation portion in accordance with a presence or an absence of a signal received through the planar coil.

18 Claims, 10 Drawing Sheets

(51) Int. Cl.
*G06F 3/046* (2006.01)
*G06F 1/16* (2006.01)

(56) References Cited

U.S. PATENT DOCUMENTS

| | | | |
|---|---|---|---|
| 8,913,041 | B2 | 12/2014 | Fukushima et al. |
| 9,063,025 | B2 | 6/2015 | Horie et al. |
| 2005/0166076 | A1 | 7/2005 | Truong |
| 2008/0203824 | A1* | 8/2008 | Koyama ................ H01F 38/14 |
| | | | 307/104 |
| 2010/0321288 | A1 | 12/2010 | Katsurahira et al. |
| 2013/0049480 | A1* | 2/2013 | Tang ...................... H02J 50/40 |
| | | | 307/104 |
| 2013/0106723 | A1* | 5/2013 | Bakken ............... G06F 3/03545 |
| | | | 345/173 |
| 2013/0199311 | A1* | 8/2013 | Horie ................... G06F 3/0383 |
| | | | 73/862.626 |
| 2016/0266686 | A1 | 9/2016 | Kobori |
| 2017/0262102 | A1* | 9/2017 | Mizuhashi ............. G06F 3/047 |
| 2017/0329439 | A1* | 11/2017 | Jeong .................... G06F 3/046 |

FOREIGN PATENT DOCUMENTS

| | | |
|---|---|---|
| JP | 2011-186803 A | 9/2011 |
| JP | 2013-161307 A | 8/2013 |
| WO | 2015/079861 A1 | 6/2016 |

* cited by examiner

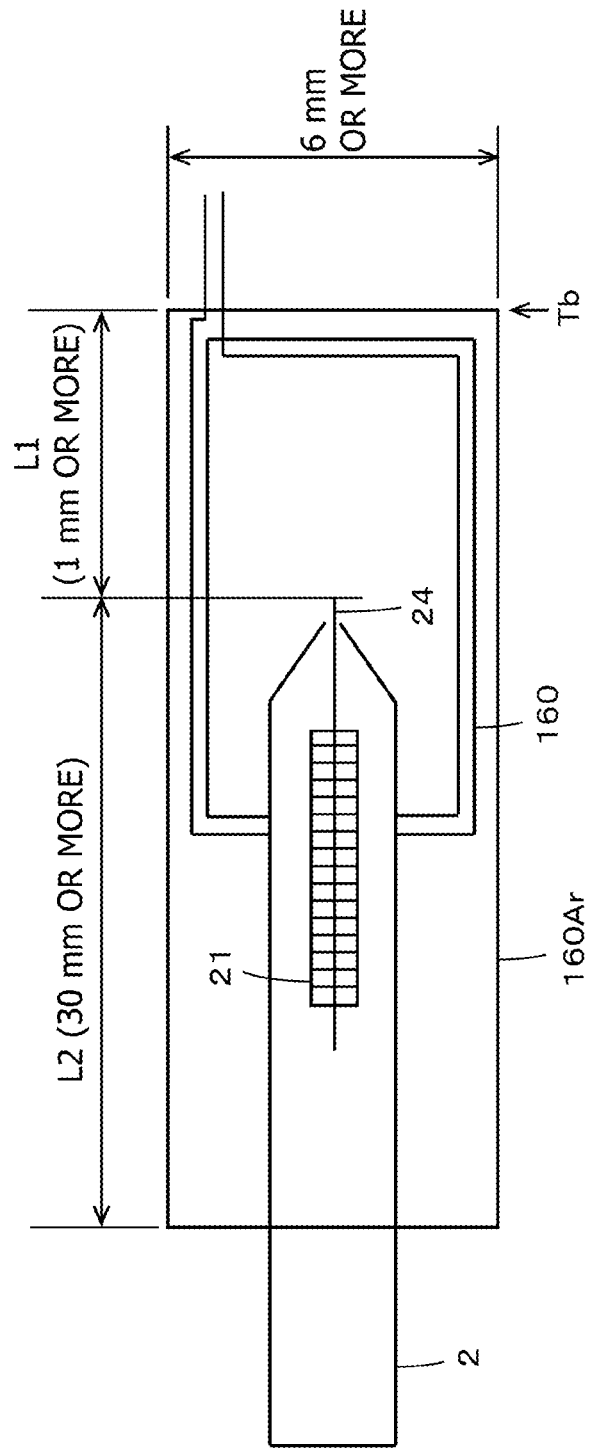

POSITION DETECTION DEVICE AND CONTROL METHOD FOR POSITION DETECTION SENSOR

BACKGROUND

1. Technical Field of the

The present disclosure relates to a position detection device which includes a position detection sensor and is used as an inputting device for various information terminals and a control method for a position detection sensor used in the position detection device.

2. Description of the Related Art

A large number of mobile information terminals in which a touch panel is incorporated such as a high function mobile phone terminal called smartphone or a tablet personal computer (PC) have been provided. A touch panel is an electronic part in which a display unit such as a liquid crystal display unit and a position detection device including a position detection sensor or a position detection circuit are combined. The touch panel allows various operation inputs by a touch operation by a finger of a user or the like.

As a position detection sensor (hereinafter referred to simply as sensor), a sensor of the capacitive type and a sensor of the electromagnetic induction type are available. The capacitive type sensor detects a variation of the capacitance between an indicator and a plurality of conductors provided on the sensor to detect a position indicated by the indicator. Since a finger of the user may be used as the indicator, the sensor allows a touch input by a finger. Meanwhile, in the electromagnetic induction type sensor, a signal is transferred through electromagnetic induction between an electronic pen (position indictor) for exclusive use, which has a built-in resonance circuit formed from an inductor element (coil) and a capacitor element (capacitor), and a loop coil group provided on the sensor side to detect a position indicated by the electronic pen. Since the electronic pen for exclusive use is used, a fine instruction input can be performed, and also it is possible to input information according to a writing pressure by a writing pressure detection function of the electronic pen.

Also a mobile information terminal is available which includes a sensor of the hybrid type provided with both a sensor of the capacitive type and a sensor of the electromagnetic induction type and compatible with both an input by a finger of the user and a fine input by an electronic pen for exclusive use. In a mobile information terminal in which such a hybrid type sensor as just described is incorporated, many simple operations are performed by a touch operation by a finger of the user. Therefore, to normally keep a sensor of the electromagnetic induction type in an operative state is not preferable in that it accelerates the exhaustion of the battery.

Therefore, some mobile information terminals in which a sensor of the hybrid type is incorporated includes an accommodation portion for an electronic pen in a housing such that, when an electronic pen is accommodated in the accommodation portion, the sensor of the electromagnetic induction type is kept in an inoperative state. In other words, when an electronic pen is accommodated in the accommodation portion for an electronic pen, operation only of the sensor of the capacitive type is permitted. On the other hand, if no electronic pen is accommodated in the accommodation portion for an electronic pen, at least operation of the sensor of the electromagnetic induction type is permitted. Since this makes it possible for the sensor of the electromagnetic induction type to operate only when the electronic pen is in a used state, power saving of the battery can be anticipated.

Conventionally, detection of whether or not an electronic pen is accommodated in an accommodation portion for an electronic pen provided on a mobile information terminal is performed by such a mechanical switch as disclosed, for example, in FIG. 2 of Japanese Patent Laid-Open No. 1998-013893. Also it is known to incorporate a magnet in an electronic pen and provide a magnetic sensor having a configuration of a Hall element in a mobile information terminal such that detection of whether or not the electronic pen is accommodated in the accommodation portion is performed.

In recent years, it has been and is demanded for a mobile information terminal and an electronic pen to have a waterproof specification so as to withstand its use outdoors on a rainy day or around a body of water such as a sea, a river or a lake. However, where a mechanical switch for detecting whether or not such an electronic pen as described above is accommodated is to be provided in an accommodation portion for an electronic pen on a mobile information terminal, since a gap is generated at a portion which operates as the switch, it is difficult to have the waterproof specification. Also, where a magnet is incorporated in an electronic pen and a magnetic sensor is provided on a mobile information terminal side, the magnet incorporated in the electronic pen has an influence on the resonance circuit of the electronic pen, a circuit portion of the sensor side for position detection and so forth or a circuit portion of the mobile information terminal side has an influence on the magnetic sensor, which is not preferable.

Thus, it seems advisable to adopt such a countermeasure that a coil is disposed in an accommodation portion for an electronic pen in such a manner as to cover a coil which is built in the electronic pen such that it is detected through electromagnetic induction whether or not the electronic pen is accommodated in the accommodation portion. In particular, as depicted in FIG. 10A, an accommodation portion 203 for an electronic pen which has an opening 202 is provided on a housing of a mobile information terminal 200 in which a touch panel 201 is incorporated, and a coil 204 is provided at a position of an inner wall of the accommodation portion 203 at which, when an electronic pen is accommodated in the accommodation portion 203, the coil 204 covers a coil built in the electronic pen.

A case is considered in which an electronic pen 300 is accommodated into the accommodation portion 203 for an electronic pen. In this case, the electronic pen 300 is inserted into the inside of the coil 204 disposed in the accommodation portion 203 as indicated by an arrow mark in FIG. 10B such that the coil 204 covers a coil 301 of the electronic pen 300. Then, a signal is transmitted from the coil 204 within a fixed period, and within a later fixed period, a signal from the coil 301 which is a component of a resonance circuit of the electronic pen 300 is received. In this case, if a transmission signal from the electronic pen 300 can be received, then it can be detected that the electronic pen 300 is accommodated in the accommodation portion 203.

However, to provide the coil 204 on the inner wall of the accommodation portion 203 for an electronic pen of the mobile information terminal 200 as depicted in FIG. 10A complicates the fabrication process or may possibly result in increase of the thickness of the mobile information terminal. The fabrication process preferably is simplified as far as possible, and in recent years, also it is demanded to further reduce the thickness of a mobile information terminal. Therefore, a mobile information terminal is demanded to satisfy the requirement also for reduction of the thickness.

BRIEF SUMMARY

Taking the foregoing into consideration, it is an object of the present disclosure to provide a position detection device and a control method for a position detection sensor which can be suitably applied to a mobile information terminal and can achieve implementation of a waterproof specification, avoidance of complication of a fabrication process and further reduction in thickness of the mobile information terminal and also reduction of power consumption.

In order to attain the object described above, according to the present disclosure, there is provided a position detection device having an accommodation portion that accommodates therein an electronic pen having a position indication coil wound in an axial direction of the electronic pen. A planar coil is disposed adjacent to the accommodation portion at a position at which a center axis direction of the planar coil crosses the axial direction of the electronic pen while the electronic pen is accommodated in the accommodation portion, and numbers of magnetic fluxes, from among magnetic fluxes generated by the planar coil, interlinking in directions opposite to each other with the position indication coil of the electronic pen are not equal to each other. A first control circuit controls a supply process in which a first signal is supplied to the planar coil and a reception process in which a second signal is received through the planar coil by electromagnetic induction are performed alternately. A first detection circuit, in operation, detects a state regarding accommodation of the electronic pen in the accommodation portion in accordance with a presence or an absence of the second signal received through the planar coil. Such a configuration enables efficient transfer of a signal between the position indication coil of the electronic pen accommodated in the accommodation portion and the planar coil provided on the position detection device.

Further, supply of a signal to the planar coil and reception of a signal through the planar coil through electromagnetic induction are performed alternately by the first control circuit. While the electronic pen is accommodated in the accommodation portion, transfer of the first signal is performed through electromagnetic induction between the planar coil and the position indication coil of the electronic pen accommodated in the accommodation portion. Therefore, the accommodation state regarding accommodation of the electronic pen in the accommodation portion, namely, whether or not the electronic pen is accommodated in the accommodation portion, is detected by the first detection circuit in accordance with a presence or an absence of the second signal received through the planar coil.

Consequently, detection of whether or not the electronic pen is accommodated in the accommodation portion can be performed appropriately without providing a mechanical switch, a magnetic sensor or a coil formed spirally in the accommodation portion for an electronic pen of the electronic apparatus. Besides, since the planar coil is used, it is easy to implement a waterproof specification and complication of the fabrication process can be avoided and besides reduction in thickness of a mobile information terminal can be anticipated. In particular, although the planar coil is formed by winding a coated wire on a board, since it is planar in shape, reliable waterproof work can be performed readily by coating, for example, using a resist technology, an overall face of the planar coil with a resin material which does not block a signal. Further, even if waterproof work is applied, the thickness of the planar coil part does not increase significantly. Further, if a sensor of the electromagnetic induction type for detecting a position indicated by the electronic pen is rendered operative only when the electronic pen is not accommodated in the accommodation portion and may be used in high possibility, then also reduction of power consumption by an electronic apparatus in which the position detection device is incorporated can be anticipated.

According to the present disclosure, a position detection device and a control method for a position detection sensor which can be suitably applied to a mobile information terminal and can achieve, by using a planar coil, implementation of a waterproof specification, avoidance of complication of a fabrication process and further reduction in thickness of the mobile information terminal and also reduction of power consumption can be implemented.

The above and other objects, features and advantages of the present disclosure will become apparent from the following description and the appended claims, taken in conjunction with the accompanying drawings in which like parts or elements denoted by like reference symbols.

BRIEF DESCRIPTION OF THE DRAWINGS

FIG. 5 is a view illustrating a positional relationship between a coil of an electronic pen accommodated in an accommodation portion and a planar coil according to one or more embodiments of the present disclosure;

DETAILED DESCRIPTION

Figure 1:
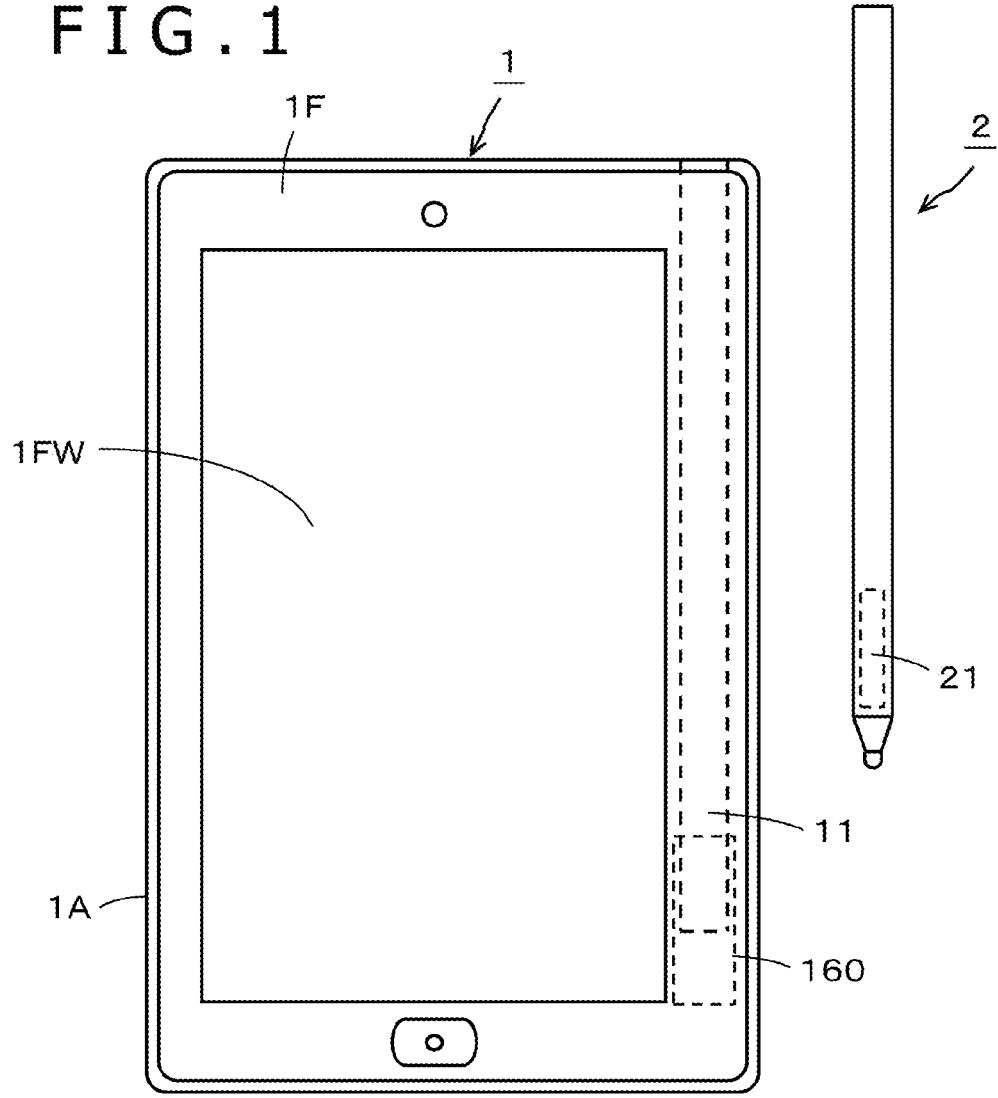
FIG. 1 is a view depicting an example of an electronic apparatus configured using an inputting device formed from a position detection device according to one or more embodiments of the present disclosure and an electronic pen.

In the following description, a position detection device and a control method for a position detection sensor according to embodiments of the present disclosure are described with reference to the accompanying drawings.

First Embodiment

[Particular Example of Electronic Apparatus]

An example of an electronic apparatus configured incorporating an inputting device including a position detection device according to the present disclosure and an electronic pen (pen type position indicator) for use with the position detection device is described with reference to FIG. 1. The electronic apparatus of the present example is a tablet PC or a high function mobile phone terminal which includes a display unit such as, for example, a liquid crystal display (LCD) unit. The electronic apparatus includes an electronic apparatus main body 1 in which the position detection device is incorporated, and an electronic pen 2.

The electronic apparatus main body 1 is configured such that an LCD unit, two position detection sensors of detection types different from each other, a mother board and so forth are stacked (disposed in an overlapping relationship with each other) between a housing 1A and a front panel 1F. In the present embodiment, of the two position detection sensors of different detection types, one is a position detection sensor of the electromagnetic induction type and the other is a position detection sensor of the capacitive type.

An opening 1FW is provided in the front panel 1F. The opening 1FW is set to a size equal to that of a display region of a display screen of the LCD unit and that of an operation region for accepting an input by a user using the electronic pen 2 or the like. Further, an accommodation portion 11 for accommodating therein the electronic pen 2 hereinafter described is provided in the housing 1A of the electronic apparatus main body 1 such that, when the electronic pen 2 is not used, the electronic pen 2 is accommodated in the accommodation portion 11.

The electronic pen 2 is used to input information through a position detection sensor of the magnetic induction type. The user takes out the electronic pen 2 accommodated in the accommodation portion 11 as occasion demands and perform a position indication operation on the operation region 1FW using the electronic pen 2. The electronic pen 2 is suitably used to perform inputting of fine information such as, for example, to input a figure or a picture.

Further, the electronic apparatus main body 1 has a position detection sensor of the capacitive type incorporated therein such that, if the user touches the operation region 1FW with a finger of a hand thereof, then such operations as rendering, inputting of a hand-written character, selection of an icon or a display button and so forth can be performed.

It is assumed here that an operation is performed by the electronic pen 2 on the operation region 1FW of the electronic apparatus main body 1. In this case, the position and the writing pressure of the operation by the electronic pen 2 are detected by the position detection sensor of the electromagnetic induction type provided in the inside of the electronic apparatus main body 1. A display control circuit (microcomputer) of the electronic apparatus main body 1 controls a display process on the display screen of the LCD unit in response to the detected position and writing pressure.

Similarly, it is assumed that, in the electronic apparatus, an operation is performed on the operation region 1FW of the electronic apparatus main body 1 by a finger of a hand or the like of the user. In this case, the position indicated by the finger or the like is detected by the position detection sensor of the capacitive type provided in the inside of the electronic apparatus main body 1. Then, in response to the detected indication position, the display control circuit of the electronic apparatus main body 1 controls a display process on the display screen of the LCD unit.

The electronic pen 2 interacts with the position detection sensor of the electromagnetic induction type as described above and includes, although details are hereinafter described, a coil 21 and a capacitor (capacitor element) which cooperate with each other to configure a resonance circuit. The coil 21 transfers a signal to and from the position detection sensor and is a position indication coil. In the case of the electronic apparatus main body 1 of the present embodiment, a planar coil 160 is provided on the lower side of the accommodation portion 11 at a position which comes in the proximity of the coil 21 built in the electronic pen 2 when the electronic pen 2 is accommodated in the accommodation portion 11 as depicted in FIG. 1.

The planar coil 160 and the coil 21 of the electronic pen 2 can transfer a signal through electromagnetic induction such that a state of accommodation of the electronic pen 2 in the accommodation portion 11 can be detected in response to a presence or an absence of a transmission signal from the coil 21 of the electronic pen 2. In other words, it can be detected whether or not the electronic pen 2 is accommodated in the accommodation portion 11. If the electronic pen 2 is accommodated in the accommodation portion 11, then detection of a position indicated by the electronic pen 2 is not performed using the position detection sensor of the electromagnetic induction type thereby to implement reduction of power consumption by the electronic apparatus main body 1.

Further, since the planar coil 160 is used, it is possible to prevent generation of a gap more easily than in a case where a mechanical switch is provided for detection of the accommodation state of an electronic pen in the accommodation portion 11, and a waterproof specification can be achieved readily. Further, different from an alternative case in which the accommodation state of an electronic pen in the accommodation portion 11 is detected by a magnetic sensor provided in the proximity of the accommodation portion 11 and a magnet mounted on the electronic pen, there is no possibility that a magnet may have an influence on the position detection sensor or the like. Further, in comparison with another alternative case in which the accommodation state of an electronic pen in the accommodation portion 11 is detected by a spiral coil provided in the accommodation portion 11, the fabrication process can be simplified, and also reduction in thickness of the electronic apparatus main body 1 can be anticipated.

[Example of Configuration of Electronic Pen]

Figure 2:
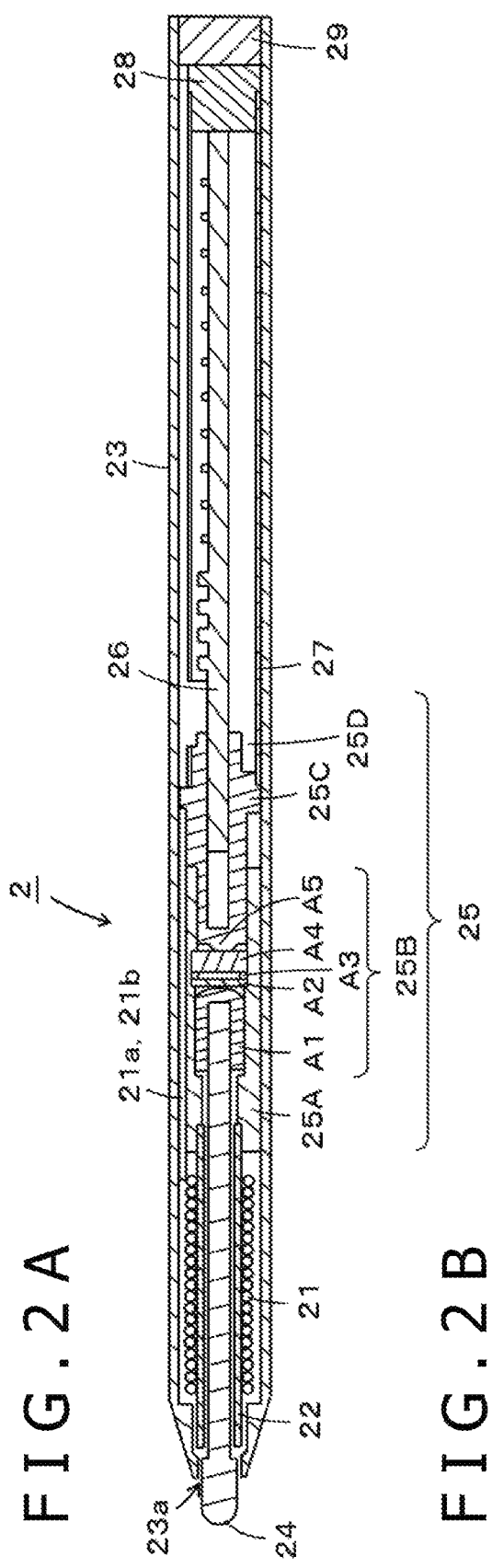
FIGS. 2A and 2B are views depicting an example of a configuration of an electronic pen according to one or more embodiments of the present disclosure.

Now, an example of a configuration of the electronic pen 2 used to indicate a position on the position detection sensor of the electromagnetic induction type incorporated in the electronic apparatus main body 1 depicted in FIG. 1 is described. FIGS. 2A and 2B are views depicting an example of a configuration of the electronic pen 2 of the present embodiment, and particularly, FIG. 2A is a cross sectional view of the electronic pen 2 and FIG. 2B is a circuit diagram depicting an equivalent circuit of the electronic pen 2.

As depicted in FIGS. 2A and 2B, the electronic pen 2 is configured such that various components that perform an electronic pen function are incorporated in a housing 23. A ferrite core 22 is formed, for example, from a cylindrical member of a ferrite material and has a through-hole formed at a position including a center line of an axial direction thereof (e.g., a central axis). The through-hole is formed with a predetermined diameter (for example, diameter=1 mm) and extends in the axial direction such that a bar-like core member 24 formed, for example, from a resin or the like is inserted therein.

The core member 24 is inserted in the through-hole of the ferrite core 22 so as to extend through the ferrite core 22. In particular, the core member 24 is longer than the length of the ferrite core 22 in the axial direction. Further, a portion of the core member 24 inserted in the through-hole of the ferrite core 22 has a diameter a little smaller than the diameter of the through-hole such that the core member 24 can slidably move in the axial direction in the through-hole. It is to be noted that an end portion of the core member 24 which serves as a pen tip has a diameter a little greater than the diameter of the through-hole of the ferrite core 22 and has a distal end portion formed in a semispherical shape such that it can move smoothly on an operation face of a touch panel or the like.

Further, as depicted in FIG. 2A, a portion of a predetermined length of the ferrite core 22 including the center in the axial direction is used as a coil wound portion around which the coil 21 is wound along the axial direction, and the portions of the ferrite core 22 on the opposite sides of the predetermined length portion are used as coil non-wound portions around which no coil is wound. In other words, when the ferrite core 22 is viewed in the axial direction, a portion from an end portion on the pen tip side to an end portion of the coil wound portion on the pen tip side is a first coil non-wound portion around which no coil is wound. Further, a portion of the ferrite core 22 from the other end of the coil wound portion to an end portion on the side opposite to the pen tip side is a second coil non-wound portion around which the coil 21 is not wound.

Extension wires (conductor lines) 21*a* and 21*b* from the opposite ends of the coil 21 wound around the ferrite core 22 are extended to a printed board 26 hereinafter described on the inner side of the housing 23 and connected to a capacitor Cf provided on the printed board 26. Consequently, a resonance circuit is configured from the coil 21 and the capacitor Cf on the printed board 26 such that a signal can be transferred through electromagnetic induction between the resonance circuit and the position detection device of the electromagnetic induction type hereinafter described.

A connection portion 25 is provided on the opposite side to the pen tip of the core member 24 and includes a molded portion 25A, a writing pressure detection portion 25B, a fitting portion 25C and a connection terminal portion 25D. The connection portion 25 is a portion which integrally connects a pen tip side portion configured from the coil 21, ferrite core 22 and core member 24 and the printed board 26 and a board protection pipe 27 hereinafter described to each other. The molded portion 25A is a portion formed cylindrically from a resin or the like, and an outer circumference of an end face of the molded portion 25A on the ferrite core 22 side is a little greater than an outer circumference of the coil wound portion of the ferrite core 22. A recessed portion is provided on the end face side of the molded portion 25A opposing to the ferrite core 22 such that the second coil non-wound portion of the ferrite core 22 is fitted in the recessed portion.

Further, a core member holding portion A1, a conductive rubber member A2, a ring spacer A3, a dielectric member A4 and a terminal member A5 are provided in the inside of the molded portion 25A as depicted in FIG. 2A. The members mentioned are sandwiched by the molded portion 25A and the fitting portion 25C hereinafter described and configure the writing pressure detection portion 25B for detecting a writing pressure.

In particular, the core member holding portion A1 is formed in a cup shape, for example, from hard rubber, and an end portion of the core member 24 on the side opposite to the pen tip side is inserted in and held by the core member holding portion A1. A bottom face portion of the core member holding portion A1 on the opposite side to the core member 24 is formed in a spherical shape. Thus, the core member holding portion A1 functions as a pressing portion for pressing the conductive rubber member A2 in response to a writing pressure applied to the core member 24.

The conductive rubber member A2 has a predetermined thickness and has a same shape and a same size as those of an opposing face of the dielectric member A4. Further, a face of the conductive rubber member A2 on the pen tip side is opposed to the bottom face portion of the core member holding portion A1 formed in a spherical shape while the other face is opposed to one face of the dielectric member A4 with the ring spacer A3 interposed therebetween.

The ring spacer A3 is a member formed in a ring shape and provides a gap of a magnitude equal to the thickness of the ring spacer A3 between the conductive rubber member A2 and the face of the dielectric member A4 on the pen tip side to separate them from each other. The dielectric member A4 is formed from a substance having dielectricity superior to conductivity such as, for example, a ceramic material and behaves, for a direct current (DC) voltage, as an insulator which blocks electricity. The terminal member A5 having a predetermined area is provided in such a manner as to be pasted to the other face of the dielectric member A4. A variable capacitor is configured from the conductive rubber member (first electrode) A2 and the terminal member (second electrode) A5 between which the dielectric member A4 is sandwiched.

In particular, the core member 24 slidably moves upwardly and downwardly along the axial direction in response to the writing pressure applied to the pen tip thereof. The core member holding portion A1 pushes the conductive rubber member A2 to move upwardly and downwardly in an interlocked relationship with the sliding movement of the core member 24. Since a gap is provided between the conductive rubber member A2 and the dielectric member A4 by the ring spacer A3, the conductive rubber member A2 moves toward and into contact with the dielectric member A4 to vary the contact area in response to the writing pressure applied to the core member 24. Consequently, the capacitance between the conductive rubber member A2 and the terminal member A5 between which the dielectric member A4 is sandwiched varies in response to the writing pressure. It is to be noted that, when no writing pressure is applied, the conductive rubber member A2 is spaced from the dielectric member A4 due to the presence of the ring spacer A3.

The conductor line connected to the conductive rubber member A2 and the conductor line connected to the terminal member A5 pass, for example, along the outer side of the molded portion 25A and the fitting portion 25C and are connected to terminals of the connection terminal portion 25D hereinafter described and further connected to an electronic circuit of the printed board 26 hereinafter described through the terminals of the connection terminal portion 25D. Consequently, the electronic circuit of the printed board 26 can detect the writing pressure applied to the core member 24 as a variation of the capacitance of the variable capacitor configured in such a manner as described above.

In the present example, the writing pressure detection portion 25B configured from the core member holding portion A1, conductive rubber member A2, ring spacer A3, dielectric member A4 and terminal member A5 is similar to a writing pressure detection unit of a known configuration disclosed, for example, in Japanese Patent Laid-Open No. 1993-275283. Alternatively, the writing pressure detection portion 25B can be configured similarly to a writing pressure detection unit of a known configuration disclosed in Japanese Patent Laid-Open No. 2011-186803. Also it is possible to configure the writing pressure detection portion 25B using such a semiconductor element whose capacitance is variable in response to the writing pressure as disclosed, for example, in Japanese Patent Laid-Open No. 2013-161307.

The fitting portion 25C is a portion to fit with the board protection pipe 27 hereinafter described. The fitting portion 25C is formed, for example, in a substantially cylindrical shape from a resin or hard rubber and is fitted firmly and integrally with the molded portion 25A. Consequently, as described hereinabove, the core member holding portion A1, conductive rubber member A2, ring spacer A3, dielectric member A4 and terminal member A5 are sandwiched by the molded portion 25A and the fitting portion 25C, and the writing pressure detection portion 25B configured from the members just described is held stably in the housing 23.

Further, a recessed portion is provided on the inner side of the fitting portion 25C such that a distal end portion of the printed board 26 hereinafter described is fitted into the recessed portion. It is to be noted that the outer diameter of the fitting portion 25C is a little greater than the inner diameter of the board protection pipe 27 such that the fitting portion 25C can fit firmly with the board protection pipe 27. Thus, where the board protection pipe 27 is fitted with the fitting portion 25C, the outer circumference of the board protection pipe 27 coincides with the outer circumference of the fitting portion 25C or the molded portion 25A.

The connection terminal portion 25D is a portion formed from two upper and lower plate portions connecting to the fitting portion 25C as depicted in FIG. 2A. The plate portions sandwich therebetween the printed board 26 hereinafter described. In this case, the distance between the two upper and lower plate portions is a little smaller than the thickness of the printed board 26 such that the two upper and lower plate portions can sandwich the printed board 26 therebetween.

One of the two plate portions, for example, the upper side plate portion in FIG. 2A, is provided such that the terminal described hereinabove to which the conductor lines from the conductive rubber member A2 and the terminal member A5 are connected extends from the upper side face to the lower side face of the upper side place portion surrounding an end face of the upper side place portion on the circuit board side. Consequently, when the printed board 26 is inserted into the connection terminal portion 25D, the terminal of the upper side plate portion is automatically connected to a terminal portion of the electronic circuit provided on the printed board 26.

The printed board 26 is formed such that terminals to the electronic circuit described hereinabove and various circuit parts configuring the electronic circuit are mounted on an insulating board of a rectangular shape and wiring lines connecting the terminals and the circuit parts to each other are provided. The various circuit parts include an integrated circuit (IC) which functions as a control circuit, a plurality of capacitors Cf and so forth. The printed board 26 is accommodated in the inside of and protected by the board protection pipe 27 as depicted in FIG. 2A.

The board protection pipe 27 is formed using a metal, a carbon material, a synthetic resin or the like and is a hard pipe member which is less likely to bend or curve. The board protection pipe 27 has a core member side opening and a rear end side opening at the opposite ends thereof. The core member side opening and the rear end side opening are opening portions extending in a direction crossing with the axial direction. The fitting portion 25C of the connection portion 25 is inserted into and fitted with a portion of the board protection pipe 27 within a predetermined range from the core member side opening.

Similarly, a pipe lid 28 is inserted into and fitted with a portion of the board protection pipe 27 within a predetermined range from the rear end side opening. Also the pipe lid 28 has a recessed portion provided thereon in which an end portion of the printed board 26 is to be inserted.

Consequently, the pen tip side portion in which the core member 24 is inserted in the ferrite core 22 having the coil 21 wound thereon, the connection portion 25, the board protection pipe 27 in which the printed board 26 is accommodated and the pipe lid 28 are connected integrally with each other and accommodated in the housing 23 thereby to configure the electronic pen 2.

The electronic pen 2 of the present embodiment is represented by an equivalent circuit depicted in FIG. 2B. In particular, the coil 21, the writing pressure detection portion 25B having a configuration of a variable capacitor and the capacitor Cf on the printed board 26 are connected in parallel to each other to configure a resonance circuit. Consequently, the electronic pen 2 can transmit and receive a signal to and from the position detection device which includes a position detector sensor of the electromagnetic induction type hereinafter described.

Further, the electronic pen 2 of the present embodiment can transmit and receive a signal to and from the planar coil 160, which is provided in the proximity of the accommodation portion 11 of the electronic apparatus main body 1 in which the electronic pen 2 is accommodated, through electromagnetic induction. Consequently, the electronic apparatus main body 1 can appropriately detect whether or not the electronic pen 2 is accommodated in the accommodation portion 11 and can control, when the electronic pen 2 is accommodated in the accommodation portion 11, such that detection of an indication position by the position detection device of the electromagnetic induction type is not performed.

[Outline of Coordinate Detection Sensor of Electromagnetic Induction Transfer Type]

Figure 3:
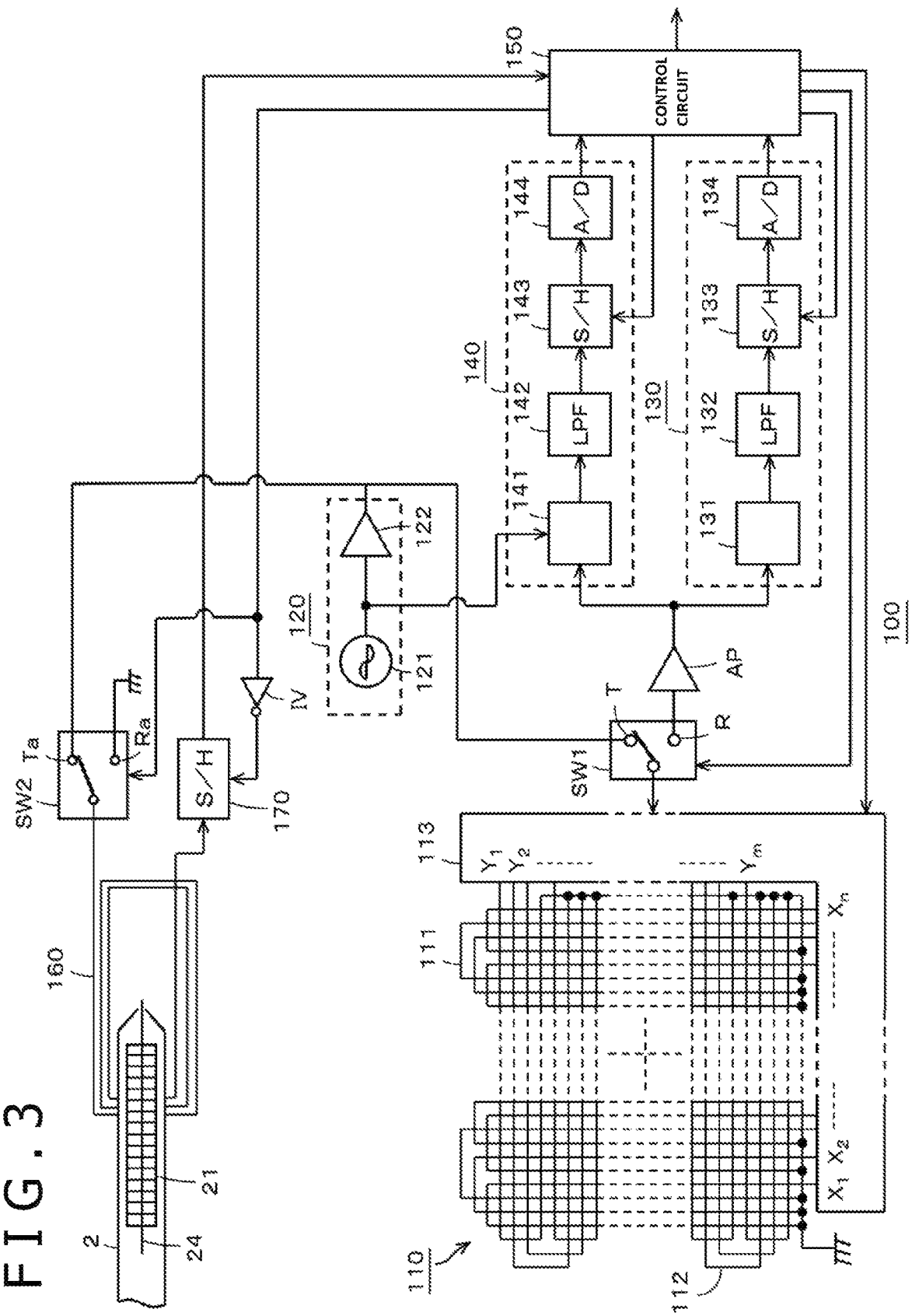
FIG. 3 is a block diagram depicting a general configuration of an electronic pen and an example of a circuit configuration of a position detection device according to one or more embodiments of the present disclosure.

Now, an example of a circuit configuration of an embodiment of a position detection device 100 of the electromagnetic induction transfer type which performs detection of an indication position and a writing pressure using the electronic pen 2 of the electromagnetic induction transfer type described hereinabove with reference to FIGS. 2A and 2B. FIG. 3 is a block diagram depicting a general configuration of the electronic pen 2 and an example of a circuit configuration of the position detection device 100. As described hereinabove, the electronic apparatus main body 1 incorporates the position detection device of the electromagnetic induction type and the position detection device of the capacitive coupling type, and the position detection device 100 depicted in FIG. 3 is incorporated as the position detection device of the electromagnetic induction type in the electronic apparatus main body 1.

The electronic pen 2 has the pen tip side portion in which the core member 24 extends through the through-hole provided in the ferrite core 22 around which the coil 21 is wound, the through-hole extending at a position including the axis of the ferrite core 22 along the axis, as described hereinabove with reference to FIG. 2A. Further, as described hereinabove with reference to FIGS. 2A and 2B, the coil 21 of the electronic pen 2 is connected to the writing pressure detection portion 25B and the capacitor Cf of the printed board 26 so as to configure the resonance circuit.

Meanwhile, the position detection device 100 is configured from a position detection circuit (main sensor unit) for detecting a position indicated by the electronic pen 2 and a writing pressure applied to the electronic pen 2, and an accommodation sensor circuit (sub sensor unit) for detecting whether or not the electronic pen 2 is accommodated in the accommodation portion 11. First, a configuration of the position detection circuit is described.

The position detection circuit includes a position detection sensor 110 which is a main sensor. The position detection sensor 110 is configured by providing an X-axis direction loop coil group 111 and a Y-axis direction loop coil group 112 in a stacked state. Each of the loop coil groups 111 and 112 is configured, for example, from 40 or more rectangular loop coils. The loop coils configuring each of the loop coil groups 111 and 112 are disposed in a juxtaposed relationship at equal distances and in a successively overlapping relationship with each other.

The position detection sensor 110 configured from the loop coil groups 111 and 112 is connected to a circuit including a reception amplifier AP, an oscillation circuit unit 120, a position detection circuit 130, a writing pressure detection circuit unit 140 and a control circuit (e.g., a central processing unit, controller, or microprocessor storing instructions for performing the processing described below) 150 through a selection circuit 113 and a switch circuit SW1. The selection circuit 113 is connected to the X-axis direction loop coil group 111 and the Y-axis direction loop coil group 112. The selection circuit 113 selects an arbitrary one of the loop coils of the two loop coil groups 111 and 112 under the control of the control circuit 150 hereinafter described.

The oscillation circuit 120 is configured from an oscillator 121 and a current driver 122. The oscillator 121 generates an alternating current (AC) signal of a frequency f0 and supplies the AC signal to the current driver 122 and a synchronous detector 141 of the writing pressure detection circuit 140 hereinafter described. The current driver 122 converts the AC signal supplied thereto from the oscillator 121 into current and sends out the current to the switch circuit SW1. The switch circuit SW1 changes over the connection destination (a transmission side terminal T or a reception side terminal R) to which a loop coil selected by the selection circuit 113 under the control of the control circuit 150 hereinafter described. Of the connection destinations, the transmission side terminal T is connected to the current driver 122 and the reception side terminal R is connected to the reception amplifier AP.

An induced voltage generated in a loop coil selected by the selection circuit 113 (a reception signal from the electronic pen 2) is sent out to the reception amplifier AP through the selection circuit 113 and the switch circuit SW1. The reception amplifier AP amplifies the induced voltage supplied thereto from the loop coil and sends out the amplified induced voltage to a detector 131 of the position detection circuit unit 130 and the synchronous detector 141 of the writing pressure detection circuit unit 140.

The detector 131 of the position detection circuit 130 detects an induced voltage generated in a loop coil, namely, a reception signal, and sends out the detected reception signal to a low-pass filter 132. The low-pass filter 132 has a cutoff frequency sufficiently lower than the frequency f0, and converts an output signal of the detector 131 into a DC signal and sends out the DC signal to a sample and hold circuit 133. The sample and hold circuit 133 holds a voltage value at a predetermined timing of the output signal of the low-pass filter 132, particularly at a predetermined timing within a reception period, and sends out the held voltage value to an analog to digital (A/D) conversion circuit 134. The A/D conversion circuit 134 converts an analog output of the sample and hold circuit 133 into a digital signal and sends out the digital signal to the control circuit 150.

On the other hand, the synchronous detector 141 of the writing pressure detection circuit 140 synchronously detects an output signal of the reception amplifier AP with an AC signal from the oscillator 121 and sends out a signal of a level according to a phase difference between the signals to a low-pass filter 142. The low-pass filter 142 has a cutoff frequency sufficiently lower than the frequency f0, and converts an output signal of the synchronous detector 141 into a DC signal and sends out the DC signal to a sample and hold circuit 143. The sample and hold circuit 143 holds a voltage value at a predetermined timing of the output signal of the low-pass filter 142 and sends out the held voltage value to an A/D conversion circuit 144. The A/D conversion circuit 144 converts an analog output of the sample and hold circuit 143 into a digital signal and sends out the digital signal to the control circuit 150.

The control circuit 150 controls the components which configure the position detection circuit (main sensor unit) and the accommodation sensor circuit (sub sensor unit) hereinafter described. In particular, the control circuit 150 controls selection of a loop coil by the selection circuit 113, changeover of the switch circuit SW1, and timings of the sample and hold circuits 133 and 143. The processing control unit 150 controls the X-axis direction loop coil group 111 and the Y-axis direction loop coil group 112 to transmit a signal (electromagnetic induction signal) within a fixed transmission duration on the basis of input signals from the A/D conversion circuits 134 and 144.

In each of the loop coils of the X-axis direction loop coil group 111 and the Y-axis direction loop coil group 112, an induced voltage is generated by a signal transmitted thereto from the electronic pen 2. The control circuit 150 calculates a coordinate value in each of the X-axis direction and the Y-axis direction of a position indicated by the electronic pen 2 on the basis of the voltage values of the induced voltages generated in the loop coils. Further, the control circuit 150 detects a writing pressure on the basis of a phase difference between a transmitted signal and a received signal.

Now, a configuration of the accommodation sensor circuit (sub sensor unit) is described. As described hereinabove, the accommodation sensor circuit includes the planar coil 160 which is a sub sensor provided in the proximity of the accommodation portion 11 for the electronic pen 2. The planar coil 160 is connected at one end portion thereof to the oscillation circuit 120 or the ground through a switch circuit SW2. Further, the planar coil 160 is connected at the other end portion thereof to a sample and hold circuit 170 such that an output of the sample and hold circuit 170 is supplied to the control circuit 150.

The switch circuit SW2 and the sample and hold circuit 170 are controlled by a control signal from the control circuit 150. The control circuit 150 forms a control signal for alternately providing a transmission period and a reception period. Here, the transmission period is a period within which current from the oscillation circuit 120 is supplied to the planar coil 160 such that an induced voltage is generated in the coil 21 of the electronic pen 2 through electromagnetic induction and within which the control signal from the control circuit 150 indicates an on state (high level). On the other hand, the reception period is a period within which current from the capacitor Cf is supplied to the coil 21 of the electronic pen 2 such that an induced voltage (reception signal) generated in the planar coil 160 through electromagnetic induction is detected and within which the control signal from the control circuit 150 indicates an off state (low level).

In this manner, the control circuit 150 forms a control signal which indicates an on state within a transmission period and indicates an off state within a reception period, and supplies the control signal to the switch circuit SW2 and further to the sample and hold circuit 170 through an inversion circuit IV. Accordingly, while a control signal for an on state is supplied to the switch circuit SW2, a control signal for an off state is supplied to the sample and hold circuit 170. In contrast, while a control signal for an off state is supplied to the switch circuit SW2, a control signal for an on state is supplied to the sample and hold circuit 170.

Consequently, within a transmission period within which the control signal from the control circuit 150 indicates an on state, the switch circuit SW2 is changed over to a terminal Ta side, and current from the oscillation circuit 120 is supplied to the planar coil 160. On the other hand, within a transmission period within which the control signal from the control circuit 150 indicates an on state, since the sample and hold circuit 170 is supplied with a control signal for an off state by the function of the inversion circuit IV, the sample and hold circuit 170 does not operate within this period but is grounded though not depicted.

Accordingly, within a transmission period, since magnetic fluxes are generated from current flowing through the planar coil 160, if the coil 21 of the electronic pen 2 is positioned in the proximity of the planar coil 160, then current flows through the coil 21 and an induced voltage is generated across the coil 21. In other words, transmission of a signal from the planar coil 160 to the coil 21 of the electronic pen 2 is performed through electromagnetic induction. Since the resonance circuit is formed from the coil 21 and the capacitor Cf in the electronic pen 2, charge according to the induced voltage is accumulated into the capacitor Cf.

On the other hand, within a reception period within which the control signal from the control circuit 150 indicates an off state, the switch circuit SW2 is changed over to a terminal Ra side and one end portion of the planar coil 160 is grounded. In this case, within a transmission period within which the control signal from the control circuit 150 indicates an off state, the sample and hold circuit 170 is supplied with a control signal for an on state by the function of the inversion circuit IV and operates within this period.

As described hereinabove, since, within a transmission period, charge is accumulated into the capacitor Cf configuring the resonance circuit of the electronic pen 2, within a reception period, the charge accumulated in the capacitor Cf flows as current to the coil 21 of the electronic pen 2 such that magnetic fluxes are generated in the coil 21. Therefore, the magnetic fluxes generated by the coil 21 of the electronic pen 2 act to cause current to flow through the planar coil 160 positioned in the proximity of the coil 21 of the electronic pen 2, whereupon an induced voltage is generated across the planar coil 160. In other words, transmission of a signal from the coil 21 of the electronic pen 2 to the planar coil 160 is performed through electromagnetic induction. The sample and hold circuit 170 samples the induced voltage generated across the planar coil 160 within a reception period and holds the sampled voltage value and then transmits the sampled voltage value to the control circuit 150.

Consequently, if the voltage value from the sample and hold circuit 170 is equal to or higher than a fixed value, then it can be recognized that transfer of a signal between the planar coil 160 and the coil 21 of the electronic pen 2 through electromagnetic induction is performed. In this case, the control circuit 150 can detect that the electronic pen 2 is accommodated in the accommodation portion 11. In contrast, if the voltage value from the sample and hold circuit 170 is lower than the fixed value, then it can be recognized that transfer of a signal between the planar coil 160 and the coil 21 of the electronic pen 2 through electromagnetic induction is not performed. In this case, the control circuit 150 can detect that the electronic pen 2 is not accommodated in the accommodation portion 11.

Then, if the control circuit 150 detects that the electronic pen 2 is accommodated in the accommodation portion 11, then it controls the components so as not to perform a detection process of an indication position and a writing pressure through the position detection sensor 110. In contrast, if the control circuit 150 detects that the electronic pen 2 is not accommodated in the accommodation portion 11, then it controls the components so as to perform a detection process of an indication position and a writing pressure through the position detection sensor 110. Consequently, it is possible to avoid, when such detection is not required, driving of the position detection sensor 110 thereby to achieve reduction of the power consumption.

[Positional Relationship Between Coil of Electronic Pen and Planar Coil]

Figure 4A:
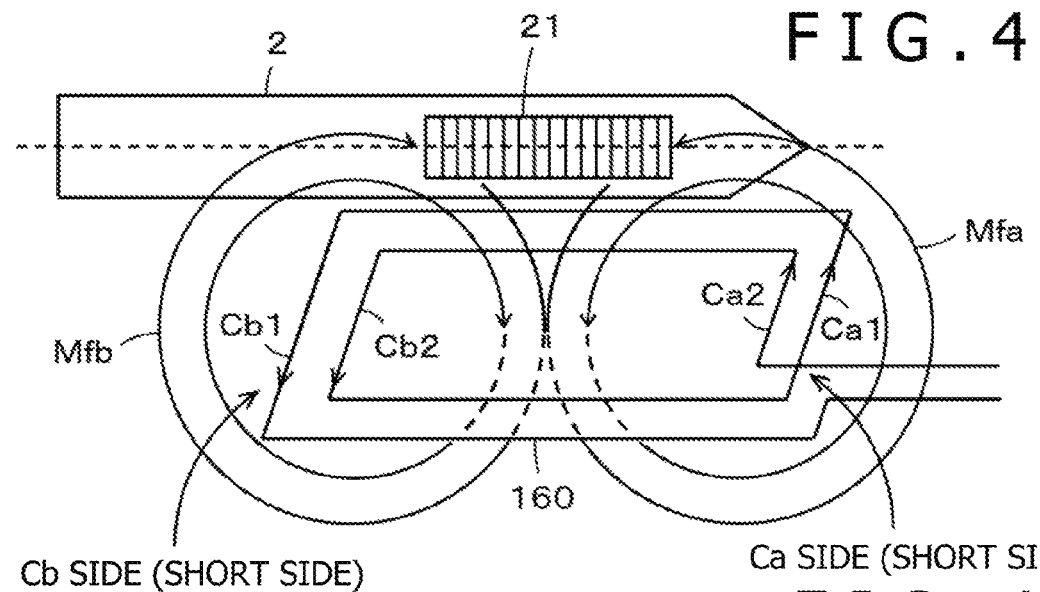
FIGS. 4A, 4B and 4C are views illustrating a positional relationship between a planar coil and a coil of an electronic pen and magnetic fluxes generated from the planar coil according to one or more embodiments of the present disclosure.
Figure 4B:
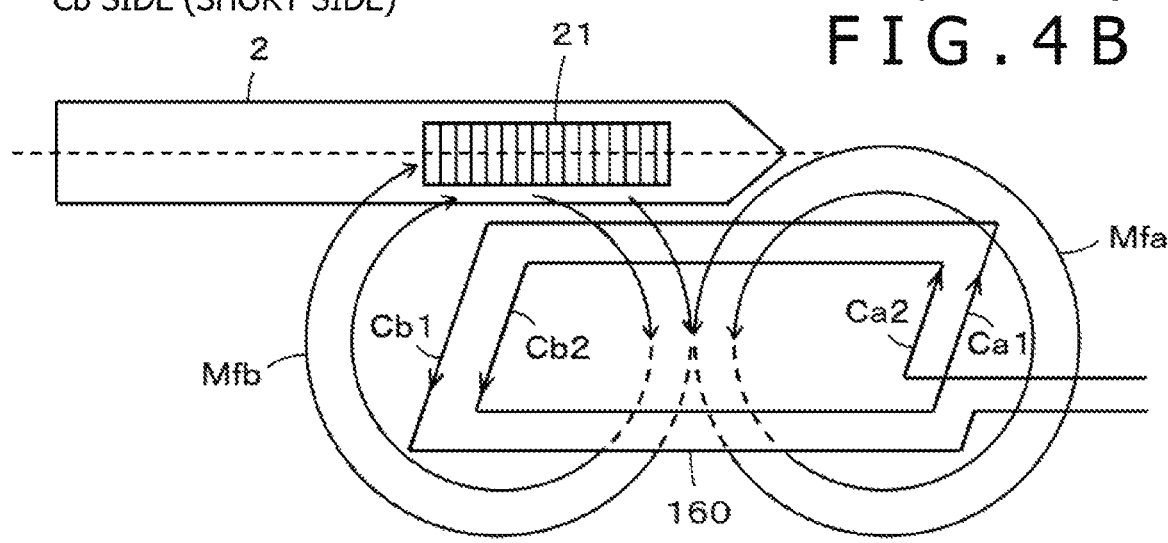
Figure 4C:
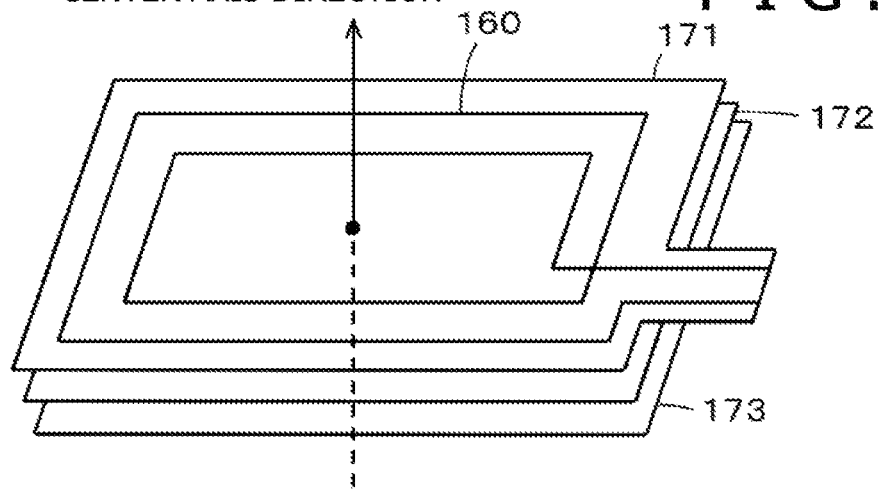

FIGS. 4A to 4C illustrate a positional relationship between the planar coil 160 and the coil 21 of the electronic pen 2 and a magnetic field and magnetic fluxes generated by the planar coil 160. The coil 21 built in the electronic pen 2 is wound along the axial direction indicated by a broken line on the electronic pen 2 in FIGS. 4A and 4B as described hereinabove. Further, the planar coil 160 provided in the proximity of the accommodation portion 11 in which the electronic pen 2 is accommodated is provided in the proximity of the coil 21 of the electronic pen 2 accommodated in the accommodation portion 11 such that the planar coil 160 extends substantially in parallel to the axis of the electronic pen 2 as depicted in FIGS. 4A and 4B.

As depicted in FIGS. 4A to 4C, an aggregate of fluxes of a magnetic field generated by current flowing in a direction of arrow marks along conductors Ca1 and Ca1 positioned on a short side Ca side of the planar coil 160 is denoted by reference symbol Mfa. Similarly, an aggregate of fluxes of a magnetic field generated by current flowing in a direction of arrow marks along conductors Cb1 and Cb1 positioned on a short side Cb side of the planar coil 160 is denoted by reference symbol Mfb.

Then, the planar coil 160 is disposed such that, if the electronic pen 2 is accommodated into the accommodation portion 11 of the housing 1A, then the planar coil 160 is positioned in the proximity of the coil 21 of the electronic pen 2. In this case, the magnetic fluxes Mfa and Mfb generated by the planar coil 160 interlink with the coil 21 of the electronic pen 2, whereupon current is induced in the coil 21 and charge is accumulated into the capacitor Cf connected to the coil 21. Here, the interlink signifies that the magnetic fluxes Mfa and Mfb sneak like chains through the coil 21.

It is assumed here as illustrated in FIG. 4A that the number of the magnetic fluxes Mfa interlinking with a right side portion of the coil 21 with reference to the center in the axial direction (direction indicated by a broken line in FIG. 4A) of the coil 21 provided in the electronic pen 2 and the number of the magnetic fluxes Mfb interlinking with a left side portion of the coil 21 are equal to each other. The magnetic fluxes Mfa and the magnetic fluxes Mfb act in directions opposite to each other on the coil 21 of the electronic pen 2 (in directions in which the magnetic fluxes Mfa and Mfb advance in an interlinking relationship with the coil 21) as illustrated in FIG. 4A.

In other words, the magnetic fluxes Mfa generated on the right side by the planar coil 160 and the magnetic fluxes Mfb generated on the left side by the planar coil 160 act such that current components of the opposite directions to each other are generated in the coil 21 of the electronic pen 2. Therefore, the current components generated in the coil 21 of the electronic pen 2 through electromagnetic induction cancel each other, and current does not flow efficiently through the coil 21. Consequently, sufficient charge cannot be accumulated into the capacitor Cf.

Accordingly, in this case, even if supply of current to the planar coil 160 stops, since charge is not accumulated in the capacitor Cf of the electronic pen 2, current does not flow into the coil 21 of the electronic pen 2 and a magnetic field (magnetic flux) is not generated in the coil 21. Therefore, current does not flow through the planar coil 160 in response to magnetic fluxes generated in the coil 21 of the electronic pen 2, and consequently, even if the electronic pen 2 is accommodated into the accommodation portion 11, this cannot be detected.

Therefore, in the present embodiment, the planar coil 160 is disposed such that the magnetic fluxes Mfa generated in the right side portion of the planar coil 160 or the magnetic fluxes Mfb generated in the left side portion interlink more with the coil 21 of the electronic pen 2 accommodated in the accommodation portion 11 than the other magnetic fluxes. For example, the planar coil 160 is displaced to the right side with respect to the coil 21 of the electronic pen 2 accommodated in the accommodation portion 11 in such a manner as depicted in FIG. 4B such that the magnetic fluxes Mfb generated in the left side portion of the planar coil 160 interlink more with the coil 21 of the electronic pen 2. Consequently, current can be generated efficiently in the coil 21 of the electronic pen 2 through electromagnetic induction in response to the magnetic fluxes Mfb generated in the left side portion of the planar coil 160, and charge can be accumulated sufficiently into the capacitor Cf.

Naturally, the planar coil 160 may be displaced reversely to the left side with respect to the coil 21 of the electronic pen 2 accommodated in the accommodation portion 11 such that the magnetic fluxes Mfa generated in the right side portion of the planar coil 160 may interlink more with the coil 21 of the electronic pen 2. It is to be noted that, in this case, since there is the possibility that the magnetic fluxes Mfb generated in the left side portion of the planar coil 160 may have an influence on some other portion of the electronic pen 2, it is necessary to take this point into consideration.

Further, in the present embodiment, the planar coil 160 has a configuration of a flexible printed circuit (FPC) as depicted in FIG. 4C. In particular, the planar coil 160 is formed such that a coil formed on a plane from a conductive metal such as, for example, copper is pasted to a thin and soft base film 171 having an insulating property such as, for example, polyimide. Consequently, the coil can be fixed on the same plane such that the turns of the coil are not spaced away from each other upwardly or downwardly (in a direction of the center axis) or not displaced from each other on the plane.

A magnetic metal plate 172 and a conductive metal shield 173 are provided on the lower side of the planar coil 160 in a center axis direction indicated by the line with the arrow in FIG. 4C. The magnetic metal plate 172 strengthens magnetic fluxes generated by the planar coil 160 and acts, in the example depicted in FIGS. 4A to 4C, so as to lift the magnetic fluxes efficiently from the lower side to the upper side in the axial direction of the planar coil 160. The conductive metal shield 173 is provided so as to prevent electromagnetic waves arriving from the outside from having an influence on the planar coil 160. In this manner, in the present embodiment, transfer of a signal through electromagnetic induction can be performed efficiency between the coil 21 of the electronic pen 2 accommodated in the accommodation portion 11 and the planar coil 160.

FIG. 5 is a view more particularly illustrating a positional relationship between the coil 21 of the electronic pen 2 accommodated in the accommodation portion 11 and the planar coil 160 in the present embodiment. As depicted in FIG. 5, the width of the area in which the planar coil 160 is formed is, for example, equal to or greater than 6 mm such that the coil 21 of the electronic pen 2 can be positioned on the inner side of the planar coil 160.

It is assumed that the electronic pen 2 advances in the longitudinal direction of the planar coil 160 above the planar coil 160 such that the distal end (pen tip) of the core member 24 of the electronic pen 2 is positioned at a position at which it abuts with an end portion Tb of the planar coil 160. A case is assumed in which, in the case just described, magnetic fluxes Mfa and Mfb generated by the planar coil 160 are equal in number and interlink with a half of the coil 21 on the pen tip side and the other half on the opposite side to the pen tip side with reference to the center in the axial direction of the coil 21 of the electronic pen 2 similarly as in the case depicted in FIG. 4A.

In this case, the position of the electronic pen 2 accommodated in the accommodation portion 11 is set so as to be spaced by a distance at least equal to or greater than 1 mm from the end portion Tb of the planar coil 160 toward the other end portion side as depicted in FIG. 5. If the electronic pen 2 is displaced by a distance equal to or greater than 1 mm from the end portion Tb of the planar coil 160 in this manner, then the magnetic fluxes Mfb can interlink more with the coil 21 of the electronic pen 2 similarly as in the case of the example depicted in FIG. 4B. Consequently, current can be efficiently generated in the coil 21 of the electronic pen 2 through electromagnetic induction in response to the magnetic fluxes generated by the planar coil 160.

Further, a rectangular area 160Ar which has a length equal to the sum of the length L1 from the end portion Tb of the planar coil 160 to a point at which the distal end of the core member 24 of the electronic pen 2 is positioned and the length L2 spaced by 30 mm or more from the distal end of the core member 24 of the electronic pen 2 to the rear end side of the electronic pen 2 and has a length of 6 mm or more in the vertical direction in FIG. 5 is determined as an area in which a magnetic metal plate or a conductive metal shield is to be provided. Accordingly, in the case of the example depicted in FIG. 5, the rectangular area 160Ar at least of a vertical dimension of 6 mm and a horizontal dimension of 31 mm is an area in which the planar coil 160 is to be provided and in which a magnetic metal plate or a conductive metal shield is to be provided.

Further, if the positional relationship between the planar coil 160 and the coil 21 of the electronic pen 2 is set in such a manner as illustrated in FIG. 5, then transfer of a signal through electromagnetic induction can be performed efficiently between the planar coil 160 and the coil 21 of the electronic pen 2. It is to be noted that by what distance the distal end of the core member 24 of the electronic pen 2 is to be spaced from the end portion Tb of the planar coil 160 may be determined by determining a position at which transfer of a signal can be performed efficiently through electromagnetic induction, for example, by an experiment.

[Particular Example of Control by Position Detection Device 100]

Figure 6:
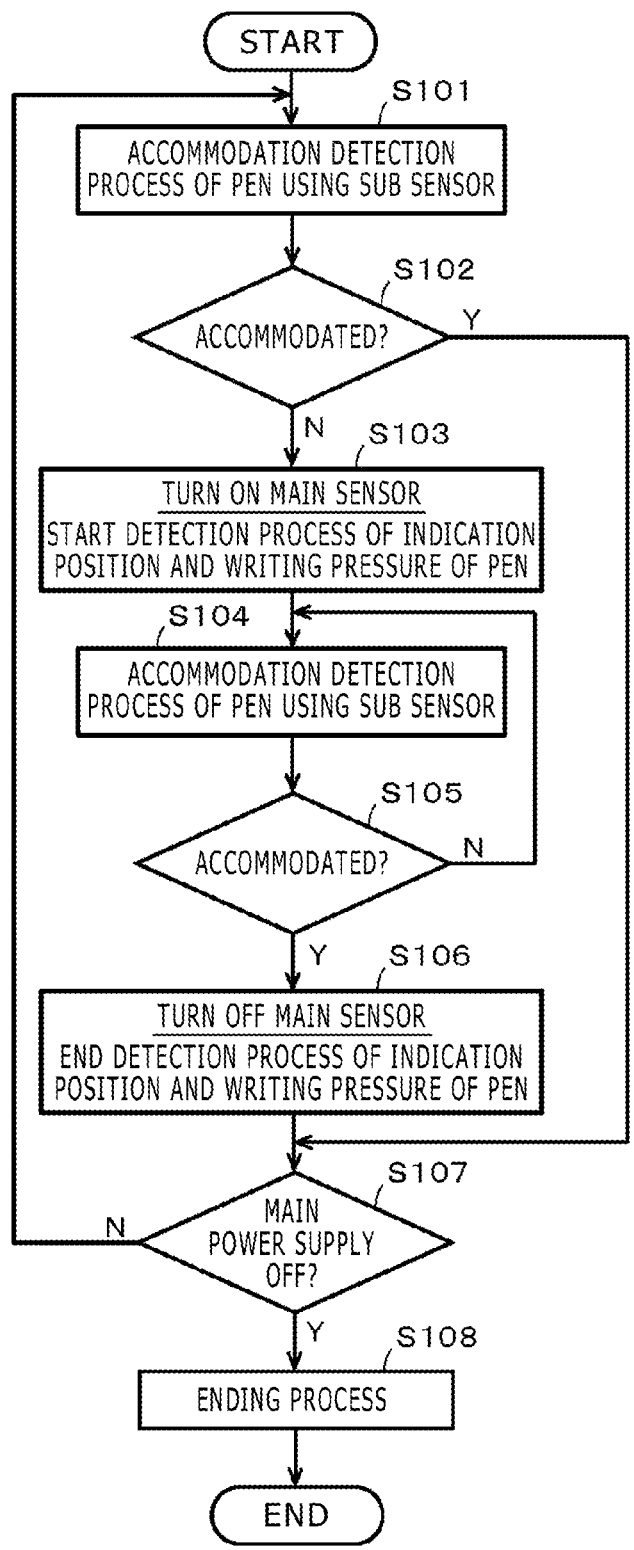
FIG. 6 is a flow chart illustrating a process performed by a controller of a position detection device according to one or more embodiments of the present disclosure.

Now, a particular example of processing control by the control circuit unit 150 of the position detection device 100 having the configuration described hereinabove with reference to FIG. 3 is described. FIG. 6 is a flow chart illustrating a process performed by the control circuit 150 of the position detection device 100 after the main power supply to the electronic apparatus main body 1 is turned on. To the process of the flow chart depicted in FIG. 6, the "control method for a position detection sensor" of the disclosure disclosed herein is applied.

The control circuit 150 first performs an accommodation detection process for detecting whether or not the electronic pen 2 is accommodated in the accommodation portion 11 using the planar coil 160 which is a sub sensor (S101). In particular, the control circuit 150 forms a control signal which indicates alternate repetitions of an on period and an off period and supplies the control signal to the switch circuit SW2 and also to the sample and hold circuit 170 through the inversion circuit IV. Consequently, to the switch circuit SW2 and the sample and hold circuit 170, control signals of the opposite phases to each other are supplied.

Accordingly, if a control signal for an on state is supplied to the switch circuit SW2, then a control signal for an off state is supplied to the sample and hold circuit 170. In this case, the switch circuit SW2 is changed over to the terminal Ta side, and the sample and hold circuit 170 is rendered inoperative and grounded. Therefore, current from the oscillation circuit 120 is supplied to the planar coil 160, whereupon magnetic fluxes are generated in the planar coil 160. Consequently, current flows into the coil 21 of the electronic pen 2 through electromagnetic induction and a signal is transmitted.

In contrast, if a control signal for an off state is supplied to the switch circuit SW2, then a control signal for an on state is supplied to the sample and hold circuit 170. In this case, the switch circuit SW2 is changed over to the terminal Ra side and grounded while the sample and hold circuit 170 is rendered operative. Therefore, current flows through the planar coil 160 through electromagnetic induction by an influence of magnetic fluxes generated by the coil 21 of the electronic pen 2, whereupon an induced voltage is generated. The induced voltage is sampled and held by the sample and hold circuit 170.

Transmission and reception of a signal through electromagnetic induction through the planar coil 160 are repeated in this manner. Then, if an induced voltage of a value equal to or higher than a fixed value determined in advance is detected, then it can be detected that the electronic pen 2 is accommodated in the accommodation portion 11. In contrast, if an induced voltage of a value equal to or higher than the fixed value determined in advance is not detected, then it can be detected that the electronic pen 2 is not accommodated in the accommodation portion 11.

Then, the control circuit 150 decides based on a result of the accommodation detection process at S101 whether or not the electronic pen 2 is accommodated in the accommodation portion 11 (S102). It is assumed that it is decided at S102 that the electronic pen 2 is not accommodated in the accommodation portion 11. In this case, since the electronic pen 2 is in a used state, the control circuit 150 controls the position detection sensor 110 which is a main sensor to function thereby to start a detection process of a position indicated by the electronic pen 2 and a writing pressure through the position detection sensor 110 (S103).

In particular, at S103, the control circuit 150 supplies control signals to control the selection circuit 113, switch circuit SW1, sample and hold circuit 133 of the position detection circuit 130 and sample and hold circuit 143 of the writing pressure detection circuit 140. In this case, the control circuit 150 starts a process for successively selecting loop coils to be used for transmission and reception of a signal from within the loop coil groups 111 and 112 and alternately changing over between a transmission period within which current from the oscillation circuit 120 is to be supplied to the selected loop coil therefor and a reception period within which a signal from the electronic pen 2 is to be received through the selected loop coil therefor. Then, within the reception period, detection of a position indicated by the electronic pen 2 on the position detection sensor 110 and detection of a writing pressure applied to the electronic pen 2 through contact of the electronic pen 2 with the position detection sensor 110 are performed by the position detection circuit 130 and the writing pressure detection circuit 140.

Thereafter, the control circuit 150 executes, at a suitable timing, an accommodation detection process for detecting whether or not the electronic pen 2 is accommodated in the accommodation portion 11 using the planar coil 160 which is a sub sensor similarly as in the process executed at step S101 (S104). Then, the control circuit 150 decides, on the basis of a result of the accommodation detection process at S104, whether or not the electronic pen 2 is accommodated in the accommodation portion 11 (S105) similarly as in the decision process executed at S102.

If it is decided in the decision process at S105 that the electronic pen 2 is not accommodated in the accommodation portion 11, then the control circuit 150 repeats the processes beginning at S104. Consequently, for a period until the electronic pen 2 is accommodated into the accommodation portion 11, detection of a position indicated by the electronic pen 2 and detection of a writing pressure applied to the electronic pen 2 are performed continuously through the position detection sensor 110 which is a main sensor.

On the other hand, it is assumed that it is decided in the decision process at S105 that the electronic pen 2 is accommodated in the accommodation portion 11. In this case, since the electronic pen 2 is not in a used state, the control circuit 150 ends the detection process of an indication position and a writing pressure through the position detection sensor 110 which is a main sensor (S106).

In particular, at S106, the control circuit 150 stops supply of the control signals to the selection circuit 113, switch circuit SW1, sample and hold circuit 133 of the position detection circuit 130 and sample and hold circuit 143 of the writing pressure detection circuit 140. Consequently, operation of the components is stopped, and the process through the position detection sensor 110 for performing detection of a position indicated by the electronic pen 2 and detection of a writing pressure applied to the electronic pen 2 is ended.

Thereafter, the control circuit 150 decides whether or not the main power supply to the electronic apparatus main body 1 is off (S107). If it is decided in the decision process at S107 that the main power supply is not off, then the control circuit 150 repeats the processes beginning at S101. On the other hand, if it is decided in the decision process at S107 that the main power supply is off, then the control circuit 150 performs a predetermined ending process such as to stop supply of power to the control circuit 150 (S108), thereby ending the process illustrated in FIG. 6.

On the other hand, it is assumed that it is decided in the decision process at S102 described hereinabove that the electronic pen 2 is accommodated in the accommodation portion 11. Also in this case, since the electronic pen 2 is not in a used state, the control circuit 150 does not perform detection of an indication position and a writing pressure through the position detection sensor 110 which is a main sensor and decides whether or not the main power supply to the electronic apparatus main body 1 is off (S107).

If it is decided in the decision process at S107 that the main power supply is not off, then the control circuit 150 repeats the processes beginning at S101. On the other hand, if it is decided in the decision process at S107 that the main power supply is off, then the control circuit 150 performs a predetermined ending process such as to stop supply of power to the control circuit 150 (S108), thereby ending the process illustrated in FIG. 6.

In this manner, the control circuit 150 can appropriately detect whether or not the electronic pen 2 is accommodated in the accommodation portion 11 using the planar coil 160 which is a sub sensor. Then, only when the electronic pen 2 is not accommodated in the accommodation portion 11 but is in a used state, the control circuit 150 can perform detection of a position indicated by the electronic pen 2 and detection of a writing pressure applied to the electronic pen 2 through the position detection sensor 110 which is a main sensor. Consequently, when the electronic pen 2 is in a state in which it is accommodated in the accommodation portion 11, since none of detection of a position indicated by the electronic pen 2 and detection of a writing pressure applied to the electronic pen 2 through the position detection sensor 110 is performed, reduction of the power consumption can be anticipated. Further, since the planar coil 160 is used as a sub sensor, for example, if a resist technology is used to cover the planar coil 160 with a waterproof sheet of a resin or the like, then the gap can be closed up fully and a waterproof specification can be achieved readily. Further, since the planar coil 160 is used, in comparison with an alternative case in which a coil of a spiral shape is used, complication of the fabrication process can be avoided and also reduction in thickness can be anticipated.

Second Embodiment

Figure 7:
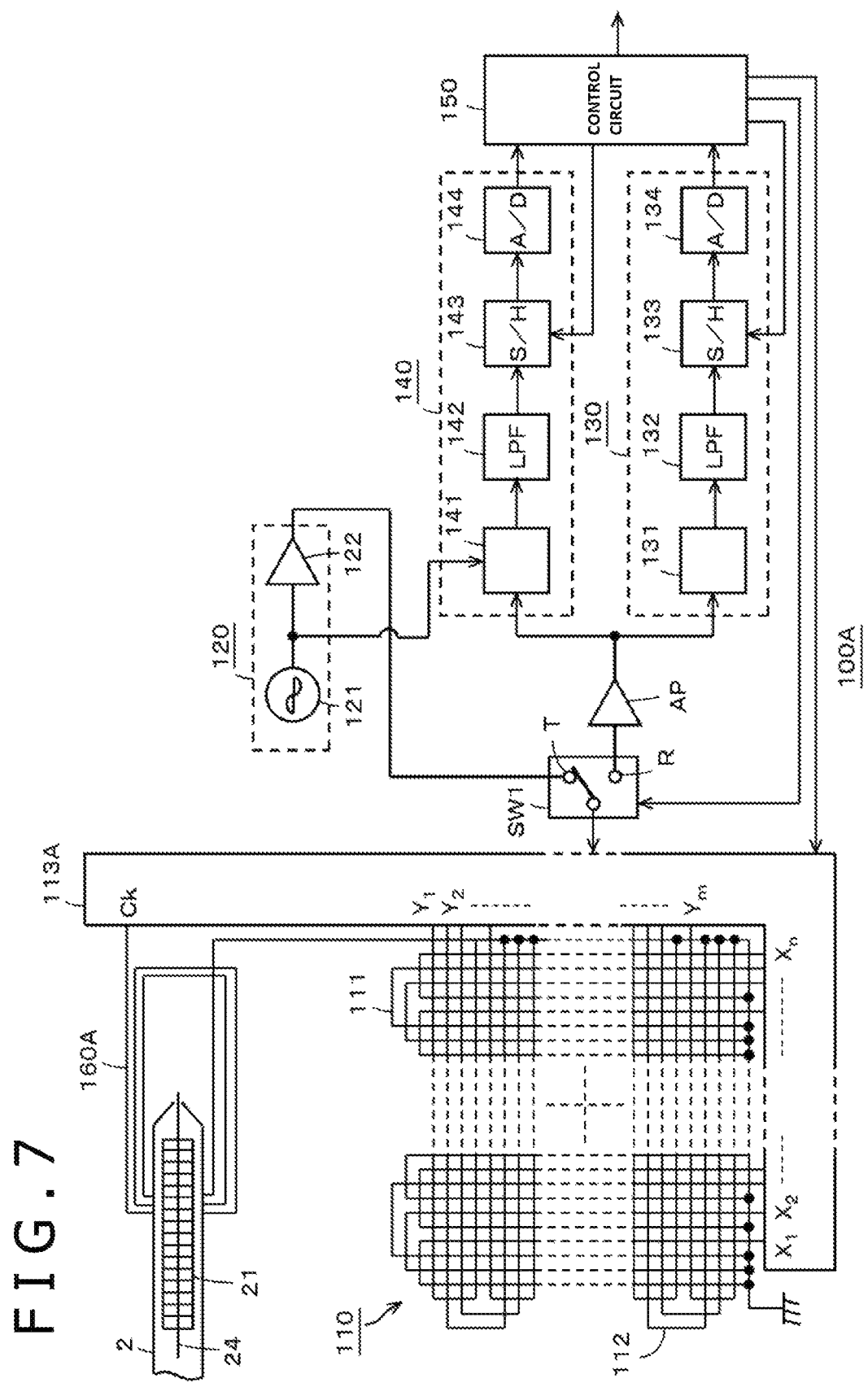
FIG. 7 is a block diagram depicting a general configuration of an electronic pen and an example of a circuit configuration of a position detection device according to one or more embodiments of the present disclosure.

FIG. 7 is a block diagram depicting a general configuration of the electronic pen of the embodiments and a position detection device 100A of a second embodiment. Also the position detection device 100A of the second embodiment described below is of the electromagnetic induction type similarly to the position detection device 100 of the first embodiment and is incorporated and used together with the position detection device of the capacitive coupling type in the electronic apparatus main body 1 depicted in FIG. 1. Accordingly, also the position detection device 100A of the second embodiment is operated by the electronic pen 2 described hereinabove with reference to FIGS. 1 and 2.

Therefore, also the position detection device 100A of the present second embodiment has a function for detecting whether or not the electronic pen 2 is accommodated in the accommodation portion 11. However, as depicted in FIG. 7, the position detection device 100A of the present second embodiment does not include the accommodation sensor circuit configured from the planar coil 160, switch circuit SW2, sample and hold circuit 170 and inversion circuit IV provided in the position detection device 100 of the first embodiment.

The position detection device 100A of the present second embodiment is configured from a planar coil 160A as a sub sensor and a position detection circuit (main sensor unit) which functions also as an accommodation sensor circuit. The position detection circuit unit has a basic configuration similar to that of the position detection device 100 of the first embodiment described hereinabove. Therefore, in FIG. 7 which is a block diagram of the position detection device 100A of the second embodiment, like elements to those of the position detection device 100 of the first embodiment depicted in FIG. 3 are denoted by like reference symbols, and overlapping detailed description of them is omitted herein to avoid redundancy.

Also the planar coil 160A in the present second embodiment is provided in the proximity of the accommodation portion 11 for the electronic pen 2 provided on the electronic apparatus main body 1 similarly as in the case of the planar coil 160 in the first embodiment. Also in the position detection device 100A of the second embodiment, magnetic fluxes of different directions generated by the planar coil 160A do not act uniformly on the coil 21 of the electronic pen 2 accommodated in the accommodation portion 11. In particular, also in the position detection device 100A of the second embodiment, the positional relationship between the coil 21 of the electronic pen 2 accommodated in the accommodation portion 11 and the planar coil 160A disposed in the proximity of the accommodation portion 11 is set to such a relationship as described hereinabove with reference to FIGS. 4B and 5.

As depicted in FIG. 7, in the position detection device 100A of the second embodiment, the planar coil 160A serving as a sub sensor is connected at one end thereof to a selection circuit 113A and grounded at the other end thereof. The configuration of the other part is similar to that of the position detection device 100 of the first embodiment depicted in FIG. 3.

Therefore, in the position detection device 100A of the present second embodiment, when it is to be detected whether or not the electronic pen 2 is accommodated in the accommodation portion 11, the control circuit 150 controls the selection circuit 113A to select the planar coil 160A. Then, the control circuit 150 controls the switch circuit SW1 to perform changeover between a period (transmission period) within which current from the oscillation circuit 120 is supplied to the planar coil 160A and another period (reception period) within which a voltage generated across the planar coil 160A is detected through electromagnetic induction. Within the reception period, the control circuit 150 controls the position detection circuit 130 to function so as to detect whether or not the planar coil 160A receives a signal from the coil 21 of the electronic pen 2 through electromagnetic induction thereby to detect whether or not the electronic pen 2 is accommodated in the accommodation portion 11.

On the other hand, detection of a position indicated by the electronic pen 2 and detection of a writing pressure applied to the electronic pen 2 are performed quite similarly to those in the case of the position detection device 100 of the first embodiment described hereinabove. In particular, the control circuit 150 supplies control signals to the selection circuit 113A, switch circuit SW1, sample and hold circuit 133 of the position detection circuit 130 and sample and hold circuit 143 of the writing pressure detection circuit 140 to control them.

In this case, the control circuit 150 successively selects a loop coil to be used for each of transmission and reception of a signal from and by the loop coil groups 111 and 112 and performs a process for performing alternate changeover between a transmission period within which current from the oscillation circuit 120 is supplied to the selected loop coil and a reception period within which a signal from the electronic pen 2 is received through the selected loop coil. Then, within the reception period, the control circuit 150 performs detection of a position indicated by the electronic pen 2 on the position detection sensor 110 and detection of a writing pressure applied to the electronic pen 2 by contact of the electronic pen 2 with the position detection sensor 110 through the position detection circuit 130 and the writing pressure detection circuit 140.

In this manner, also in the case of the position detection device 100A of the present second embodiment, it is possible to perform detection of whether or not the electronic pen 2 is accommodated in the accommodation portion 11 using the planar coil 160A serving as a sub sensor. Further, also in the case of the position detection device 100A of the present second embodiment, it is possible to perform detection of a position indicated on the position detection sensor 110 by the electronic pen 2 and detection of a writing pressure applied to the electronic pen 2.

Figure 8:
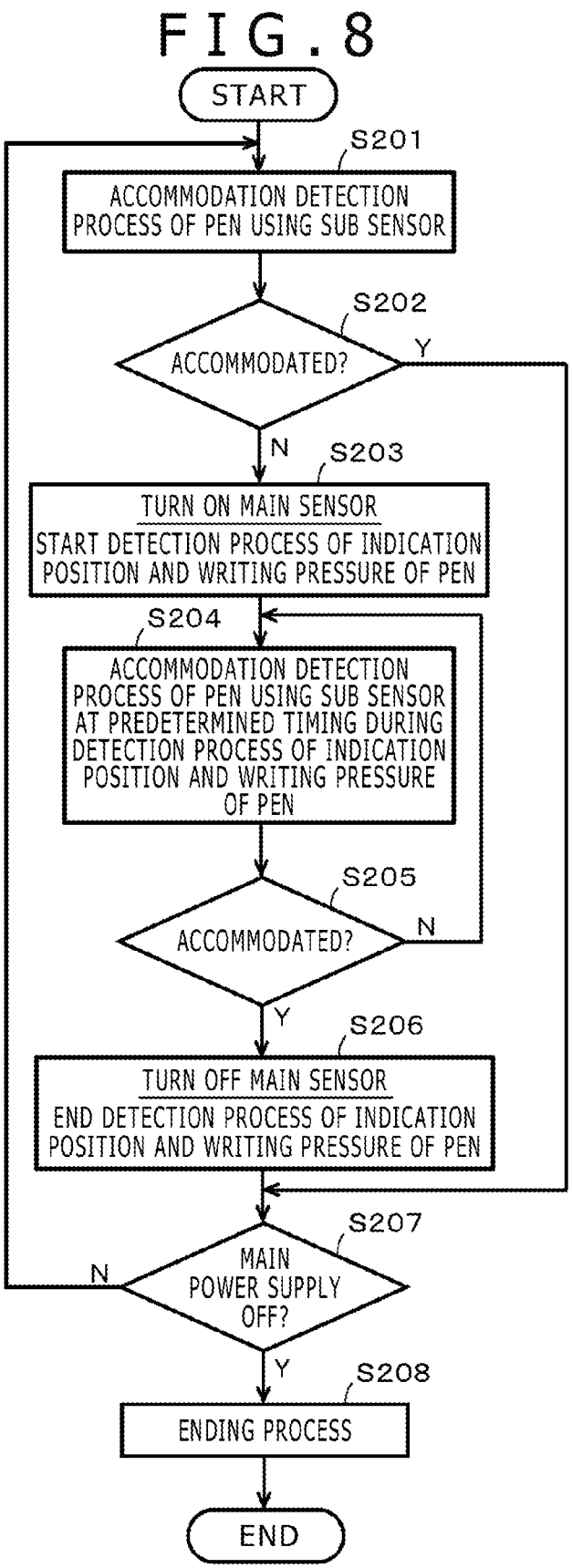
FIG. 8 is a flow chart illustrating a process performed by a controller of a position detection device according to one or more embodiments of the present disclosure.

[Particular Example of Control in Position Detection Device 100A] Now, a particular example of processing control by the control circuit 150 of the position detection device 100A of the second embodiment having the configuration described above with reference to FIG. 7 is described. FIG. 8 is a flow chart illustrating a process executed by the control circuit 150 of the position detection device 100A of the second embodiment after the main power supply to the electronic apparatus main body 1 is turned on. To the process of the flow chart depicted in FIG. 8, the "control method for a position detection sensor" of the disclosure disclosed herein is applied.

The control circuit 150 first uses the planar coil 160A which is a sub sensor to execute an accommodation detection process for detecting whether or not the electronic pen 2 is accommodated in the accommodation portion 11 (S201). In particular, the control circuit 150 controls the selection circuit 113A to select the planar coil 160A and maintain the selection. Then, the control circuit 150 forms a control signal for repeating alternate changeover between an on period and an off period and supplies the control signal to the switch circuit SW1. Further, within an off period, the control circuit 150 controls the sample and hold circuit 133 of the position detection circuit 130 to operate.

Then, if transmission and reception of a signal through electromagnetic induction through the planar coil 160A are repeated until an induced voltage of a value equal to or higher than a fixed value determined in advance is detected through the position detection circuit 130 within a reception period, then it can be detected that the electronic pen 2 is accommodated in the accommodation portion 11. In contrast, if an induced voltage of a value equal to or higher than the fixed value determined in advance is not detected through the position detection circuit 130 within a reception period, then it can be detected that the electronic pen 2 is not accommodated in the accommodation portion 11.

Then, the control circuit 150 decides on the basis of a result of the accommodation detection process at S201 whether or not the electronic pen 2 is accommodated in the accommodation portion 11 (S202). It is assumed that it is decided at S202 that the electronic pen 2 is not accommodated in the accommodation portion 11. In this case, since the electronic pen 2 is in a used state, the control circuit 150 controls the position detection sensor 110 which is a main sensor to function so as to start a detection process of a position indicated by the electronic pen 2 and a writing pressure through the position detection sensor 110 (S203). The process at S203 is similar to that at S103 performed in the position detection device 100 of the first embodiment depicted in FIG. 6.

Thereafter, at a predetermined timing, the control circuit 150 controls the selection circuit 113A to change over so as to select the planar coil 160A and executes an accommodation detection process for detecting whether or not the electronic pen 2 is accommodated in the accommodation portion 11 (S204). In particular, the process at S204 is similar to that executed at S201. Further, the predetermined timing is such a timing after, in the detection process of an indication position and a writing pressure started at S203, the detection process of one cycle determined in advance ends but before the detection process of a next cycle is started, for example.

It is to be noted that the detection process of one cycle determined in advance signifies such a detection process as one unit of processes, for example, after a detection process is started until an indication position and a writing pressure are detected successfully or until a scanning process using all loop coils of the position detection sensor 110 is completed. Accordingly, when the detection process of one cycle is completed, a new detection process is started. Therefore, if an accommodation detection process of the electronic pen 2 is performed within a period between a detection process of a certain one cycle and a detection process of a next one cycle, then the accommodation detection process of the electronic pen 2 can be performed without having an influence on the detection process of a position indicated by the electronic pen 2 and a writing pressure.

Then, the control circuit 150 decides on the basis of a result of the accommodation detection process at S204 whether or not the electronic pen 2 is accommodated in the accommodation portion 11 similarly as in the decision process performed at S202 (S205).

If it is decided in the decision process at S205 that the electronic pen 2 is not accommodated in the accommodation portion 11, then the control circuit 150 repeats the processes beginning at S204. Consequently, within a period until the electronic pen 2 is accommodated into the accommodation portion 11, detection of a position indicated by the electronic pen 2 and detection of a writing pressure applied to the electronic pen 2 through the position detection sensor 110 which is a main sensor are performed continuously.

On the other hand, it is assumed that it is decided in the decision process at S205 that the electronic pen 2 is accommodated in the accommodation portion 11. In this case, since the electronic pen 2 is not in a used state, the control circuit 150 controls the position detection sensor 110 which is a main sensor to end the detection process of an indication position and a writing pressure (S206).

In particular, at S206, the control circuit 150 controls the selection circuit 113A to maintain the state in which the planar coil 160A is selected such that transmission and reception of a signal through the planar coil 160A are repeated. Accordingly, at S206, any one of the loop coils configuring the X-axis direction loop coil group 111 and the loop coils configuring the Y-axis direction loop coil group 112 is not selected. Consequently, since the detection process of a position indicated by the electronic pen 2 using the position detection sensor 110 which is a main sensor is not performed, the power consumption can be reduced significantly.

Further, in this case, since the oscillation circuit 120, position detection circuit 130 and control circuit 150 are kept in an operative state, if the electronic pen 2 is taken out from the accommodation portion 11, then this can be also detected. It is to be noted that, when the electronic pen 2 is accommodated in the accommodation portion 11, since the writing pressure detection circuit 140 need not operate, operation of the writing pressure detection circuit 140 may be stopped.

Thereafter, the control circuit 150 decides whether or not the main power supply to the electronic apparatus main body 1 is off (S207). If it is decided in the decision process at S207 that the main power supply is not off, then the processes beginning at S201 are repeated. On the other hand, if it is decided in the decision process at S207 that the main power supply is off, then the control circuit 150 performs such a predetermined ending process as to stop supply of power to the control circuit 150 (S208), thereby ending the process illustrated in FIG. 8.

Further, it is assumed that it is decided in the decision process at S202 described hereinabove that the electronic pen 2 is accommodated in the accommodation portion 11. Also in this case, since the electronic pen 2 is not in a used state, the control circuit 150 does not perform detection of an indication position and a writing pressure through the position detection sensor 110 which is a main sensor but decides whether or not the main power supply to the electronic apparatus main body 1 is off (S207).

If it is decided in the decision process at S207 that the main power supply is not off, then the processes beginning at S201 are repeated. On the other hand, if it is decided in the decision process at S207 that the main power supply is off, then the control circuit 150 performs such a predetermined ending process as to stop supply of power to the control circuit 150 (S208), thereby ending the process illustrated in FIG. 8.

In this manner, also in the case of the position detection device 100A of the present second embodiment, the control circuit 150 can appropriately detect whether or not the electronic pen 2 is accommodated in the accommodation portion 11 using the planar coil 160A which is a sub sensor. Then, only when the electronic pen 2 is not accommodated in the accommodation portion 11 but is in a used state, detection of a position indicated by the electronic pen 2 and detection of a writing pressure applied to the electronic pen 2 through the position detection sensor 110 which is a main sensor can be performed. Consequently, when the electronic pen 2 is accommodated in the accommodation portion 11, since none of detection of a position indicated by the electronic pen 2 and detection of a writing pressure applied to the electronic pen 2 through the position detection sensor 110 is performed, reduction of the power consumption can be anticipated.

Further, since the planar coil 160A is used as a sub sensor, for example, if a waterproof sheet is used, then the gap can be closed up fully and a waterproof specification can be achieved readily. Further, since the planar coil 160A is used, in comparison with an alternative case in which a coil formed in a spiral shape is used, complication of the fabrication process can be avoided and also reduction in thickness can be anticipated.

Third Embodiment

Figure 9:
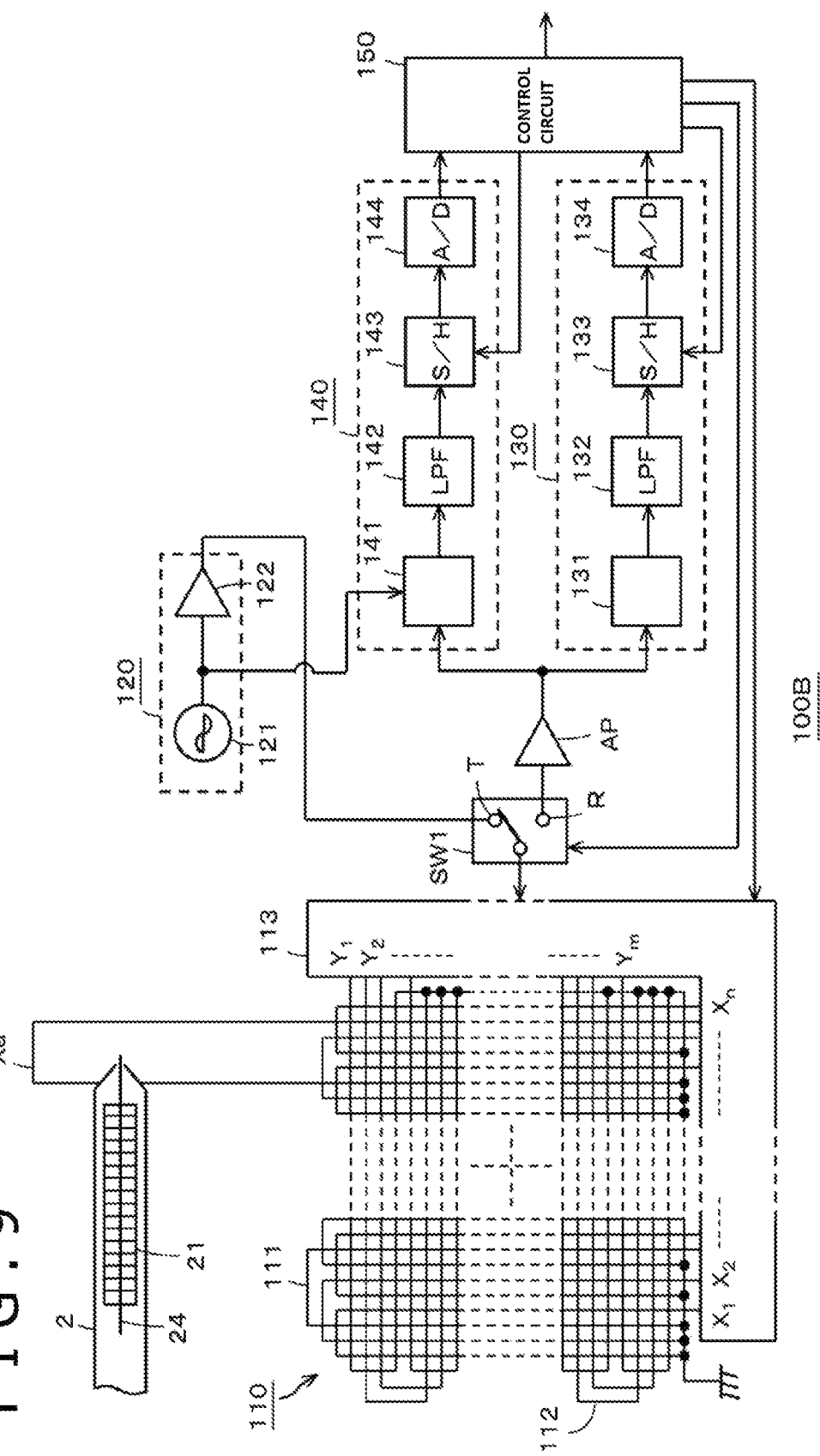
FIG. 9 is a block diagram depicting a general configuration of an electronic pen and an example of a circuit configuration of a position detection device according to one or more embodiments of the present disclosure.
Figure 10A:
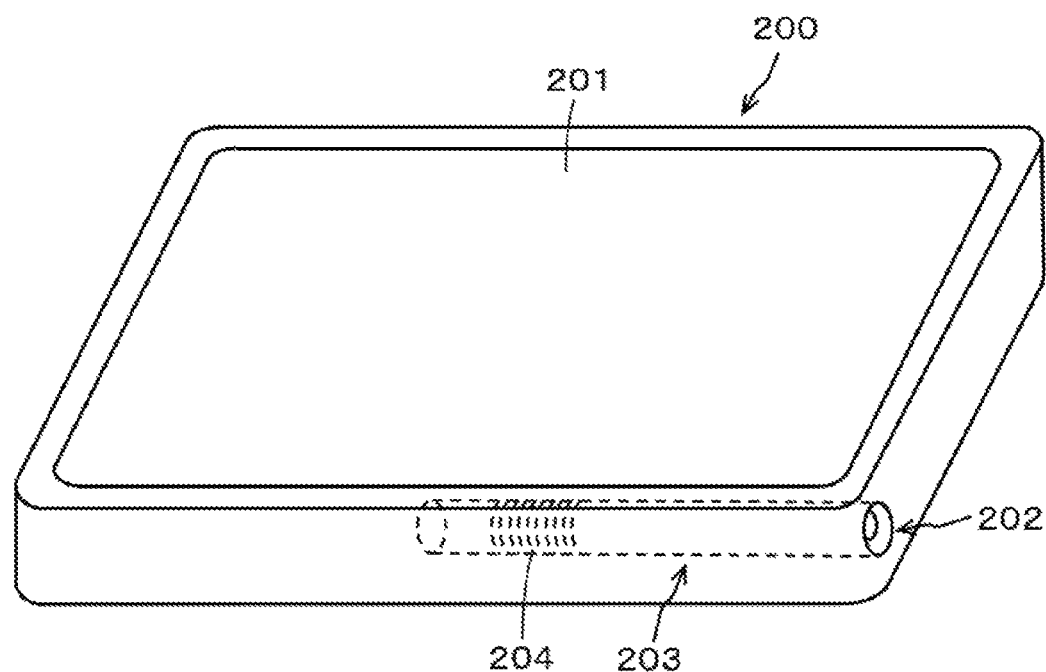
FIGS. 10A and 10B are views depicting an example of a conventional detection mechanism which performs detection of whether or not an electronic pen is accommodated in an accommodation portion.
Figure 10B:
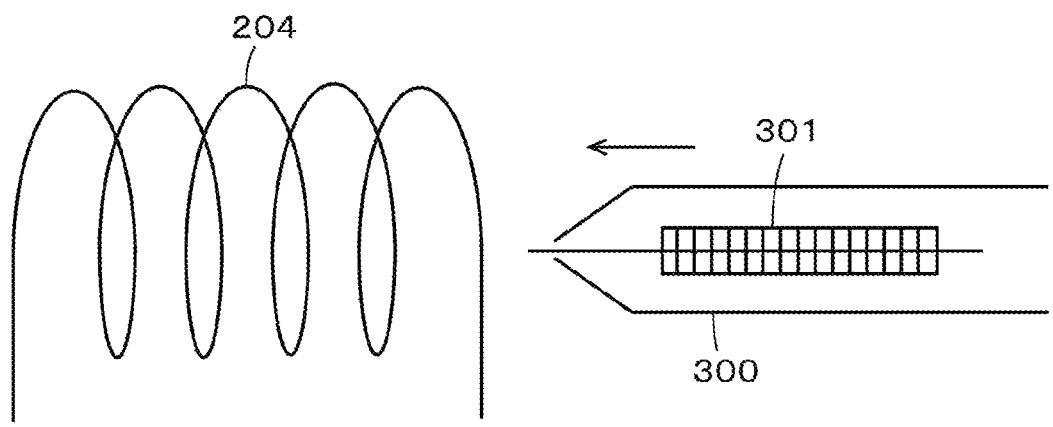

FIG. 9 is a block diagram depicting a position detection device 100B of a third embodiment. Also the position detection device 100B of the third embodiment described below is of the electromagnetic induction type similarly to the position detection devices 100 and 100A of the first and second embodiments and is incorporated and used together with the position detection device of the capacitive coupling type in the electronic apparatus main body 1 depicted in FIG. 1. Accordingly, also the position detection device 100B of the third embodiment is operated by the electronic pen 2 described hereinabove with reference to FIGS. 1 and 2.

Therefore, also the position detection device 100B of the present third embodiment has a function for detecting whether or not the electronic pen 2 is accommodated in the accommodation portion 11. However, different from the position detection devices 100 and 100A of the first and second embodiments described hereinabove, the position detection device 100B of the present third embodiment does not include any of the planar coils 160 and 160A for exclusive use as a sub sensor.

The position detection device 100B of the present third embodiment is configured such that one of the loop coils in the loop coil groups 111 and 112 configuring the position detection sensor 110 is used also as a planar coil as a sub sensor as depicted in FIG. 9. In the case of the example depicted in FIG. 9, it is depicted that the Xath loop coil in the X-axis direction loop coil group 111 is used also as a planar coil as a sub sensor. In particular, in the case of the position detection device 100B of the third embodiment, the Xath loop coil of the X-axis direction loop coil group 111 is extended so as to form a planar coil portion which functions as a sub sensor in the proximity of the accommodation portion 11.

Accordingly, in the case of the position detection device 100B of the present third embodiment, the position detection circuit 130 has a configuration which functions also as an accommodation sensor circuit. Further, the position detection device 100B is configured similarly to the position detection device 100 of the first embodiment described hereinabove except the Xath loop coil of the X-axis direction loop coil group 111. Therefore, in FIG. 9 which is a block diagram of the position detection device 100B of the third embodiment, like elements to those of the position detection device 100 of the first embodiment depicted in FIG. 3 are denoted by like reference symbols, and overlapping detailed description of them is omitted herein to avoid redundancy.

Thus, in the present third embodiment, also the planar coil portion formed by extending the Xath loop coil and functioning as a sub sensor in the proximity of the accommodation portion 11 has a positional relationship with the coil 21 of the electronic pen 2 accommodated in the accommodation portion 11 similar as in the case of the first embodiment. In other words, also in the position detection device 100B of the present third embodiment, the positional relationship between the coil 21 of the electronic pen 2 accommodated in the accommodation portion 11 and the planar coil portion formed by extending the Xath loop coil disposed in the proximity of the accommodation portion 11 is set to such a relationship as described hereinabove with reference to FIGS. 4B and 5. Consequently, the magnetic fluxes Mfa and Mfb of different directions generated by the planar coil portion do not act uniformly on the coil 21 of the electronic pen 2 accommodated in the accommodation portion 11.

Further, in the case of the position detection device 100B of the third embodiment, the control circuit 150 performs processing control similar to that performed by the control circuit 150 of the position detection device 100A of the second embodiment described hereinabove with reference to FIG. 8. However, the processes performed at S201, S204 and S206 depicted in FIG. 8 are a little different from those performed by the position detection device 100A of the second embodiment.

In particular, in the position detection device 100B of the third embodiment, the control circuit 150 performs, at S201 and S204 depicted in FIG. 8, the following processes. In particular, the control circuit 150 first controls the selection circuit 113 to select the Xath loop coil, which forms the planar coil portion, in the proximity of the accommodation portion 11 and maintains the selection. Then, the control circuit 150 forms a control signal including alternate repetitions of an on period and an off period and supplies the control signal to the switch circuit SW1. Further, within an off period, the control circuit 150 controls the sample and hold circuit 133 of the position detection circuit 130 to operate.

In this manner, transmission and reception of a signal through electromagnetic induction through the Xath loop coil which forms the planar coil portion in the proximity of the accommodation portion 11 are repeated. If an induced voltage of a value equal to or higher than a fixed value determined in advance is detected through the position detection circuit 130 within a reception period, then it can be detected that the electronic pen 2 is accommodated in the accommodation portion 11. In contrast, if an induced voltage of a value equal to or higher than the fixed value determined in advance is not detected through the position detection circuit 130 within a reception period, then it can be detected that the electronic pen 2 is not accommodated in the accommodation portion 11.

Further, in the position detection device 100B of the third embodiment, the control circuit 150 performs the following process at S206 depicted in FIG. 8. At S206, the control circuit 150 controls the selection circuit 113 to keep the state in which the Xath loop coil forming the planar coil portion is selected and repeat transmission and reception of a signal through the Xath loop coil. Accordingly, at S206, any one of the loop coils configuring the X-axis direction loop coil group 111 and the loop coils configuring the Y-axis direction loop coil group 112 is not selected except the Xath loop coil. Consequently, since a detection process of a position indicated by the electronic pen 2 using the position detection sensor 110 which is a main sensor is not performed, the power consumption can be reduced significantly.

Further, in this case, since the oscillation circuit 120, position detection circuit 130 and control circuit 150 are kept in an operative state, if the electronic pen 2 is taken out from the accommodation portion 11, then this can be also detected. It is to be noted that, in the state in which the electronic pen 2 is accommodated in the accommodation portion 11, since the writing pressure detection circuit 140 need not operate, operation of the writing pressure detection circuit 140 may be stopped.

The processes at S202, S203, S205, S207 and S208 are similar to those performed by the position detection device 100A of the second embodiment.

In this manner, in the case of the position detection device 100B of the present third embodiment, since one of the loop coils of a loop coil group configuring the position detection sensor 110 is extended to provide a planar coil portion in the proximity of the accommodation portion 11, the accommodation sensor circuit for detecting whether or not the electronic pen 2 is accommodated in the accommodation portion 11 can be configured.

Further, in the case of the position detection device 100B of the third embodiment, the control circuit 150 can appropriately detect whether or not the electronic pen 2 is accommodated in the accommodation portion 11 making use of the Xath loop coil of the position detection sensor 110. Further, only when the electronic pen 2 is not accommodated in the accommodation portion 11 but is in a used state, detection of a position indicated by the electronic pen 2 and detection of a writing pressure applied to the electronic pen 2 through the position detection sensor 110 which is a main sensor can be performed. Consequently, when the electronic pen 2 is accommodated in the accommodation portion 11, since detection of a position indicated by the electronic pen 2 and detection of a writing pressure applied to the electronic pen 2 through the position detection sensor 110 are not performed, reduction in power consumption can be anticipated.

Further, since the planar coil portion formed by extending the Xath loop coil of the position detection sensor 110 is used as a sub sensor, the gap can be closed up fully and a waterproof specification can be achieved readily by using, for example, a waterproof sheet or the like. Further, since the planar coil portion formed by extending the Xath loop coil of the position detection sensor 110 is used, in comparison with an alternative case in which a coil formed in a spiral shape is used, complication of the fabrication process can be avoided and also reduction in thickness can be anticipated.

Effects of Embodiments

The position detection devices 100, 100A and 100B of the first, second and third embodiments described hereinabove can achieve implementation of a waterproof specification, avoidance of complication in fabrication process and reduction in thickness of a mobile information terminal and can implement also reduction of the power consumption. Consequently, a position detection device and a control method for a position detection sensor which can be suitably used together with a mobile information terminal can be implemented.

Further, in the case of the position detection device 100 of the first embodiment, since an accommodation sensor circuit which detects whether or not the electronic pen 2 is accommodated in the accommodation portion 11 can be configured separately from the position detection circuit, a position detection device which can control them individually and readily can be implemented.

Meanwhile, in the case of the position detection device 100A of the second embodiment, only by providing the planar coil 160A as a sub sensor which detects whether or not the electronic pen 2 is accommodated in the accommodation portion 11, both a position detection circuit and an accommodation sensor circuit can be configured, and the position detection device 100A which is simple in configuration can be configured.

Further, in the case of the position detection device 100B of the third embodiment, one of the loop coils in a loop coil group configuring the position detection sensor 110 is used as a sub sensor which detects whether or not the electronic pen 2 is accommodated in the accommodation portion 11. Consequently, the position detection device 100B which is simpler in configuration can be configured.

[Modifications]

While it is described in the embodiments described above that both a position detection device of the electromagnetic induction type and a position detection device of the capacitive coupling type are incorporated in the electronic apparatus main body 1, the present disclosure is not limited to this. Also where only a position detection device of the electromagnetic induction type is incorporated, the present disclosure can be applied.

Further, the number of turns, shape and so forth of the planar coil 160 or 160A or the planar coil portion formed using a loop coil configuring the position detection sensor 110 as a sub sensor can be set suitably. For example, while the embodiments described above are directed to a case in which the planar coil 160 or 160A or the planar coil portion formed using a loop coil configuring the position detection sensor 110 is formed in a rectangular shape, also it is possible to form the planar coil 160 or 160A or the planar coil portion in an elliptical shape or in a circular shape.

Also it is possible to form the planar coil 160 or 160A or the planar coil portion formed using a loop coil configuring the position detection sensor 110 such that a portion thereof proximate to the coil 21 built in the electronic pen 2 has a comparatively great width while a portion thereof remote from the coil 21 built in the electronic pen 2 has a comparatively small width. In other words, the planar coil 160 or 160A or the planar coil portion formed using a loop coil configuring the position detection sensor 110 may be formed in various shapes.

Further, the planar coils 160 and 160A and the loop coil Xa may each be disposed at a position at which, from among magnetic fluxes generated thereby, the magnetic fluxes directed in the opposite directions to each other and interlinking with the coil 21 of the electronic pen 2 accommodated in the accommodation portion 11 are not equal to each other in number.

More preferably, the planar coils 160 and 160A and the loop coil Xa are each disposed at a position at which only magnetic fluxes having directions same as each other interlink with the coil 21 of the electronic pen 2 accommodated in the accommodation portion 11. In this case, the coil 21 of the electronic pen 2 accommodated in the accommodation portion 11 may be positioned in the center axis direction of one portion of the planar coil 160 or 160A or the loop coil Xa so as to extend over the portion of the planar coil 160 or 160A or the loop coil Xa as depicted in FIG. 4B.

Naturally, it is not an essential configuration that the coil 21 of the electronic pen 2 is configured so as to extend over one portion of the planar coil 160 or 160A or the loop coil Xa as depicted in FIG. 4B. The planar coil 160 or 160A or the loop coil Xa may be disposed at a position at which, from among magnetic fluxes generated by the planar coil 160 or 160A or the loop coil Xa, only those magnetic fluxes of the same direction interlink with the coil 21 of the electronic pen 2.

While preferred embodiments of the present disclosure have been described using specific terms, such description is for illustrative purposes only, and it is to be understood that changes and variations may be made without departing from the spirit or scope of the following claims.

What is claimed is:

1. A position detection device having a main body with a housing including an accommodation portion that accommodates therein an electronic pen having a position indication coil wound in an axial direction of the electronic pen, the housing of the main body of the position detection device enclosing the electronic pen while the electronic pen is accommodated in the accommodation portion, the device comprising:
   a planar coil having a rectangular cross-sectional area and disposed adjacent to the accommodation portion at a position at which a direction perpendicular to the rectangular cross-sectional area of the planar coil crosses the axial direction of the electronic pen while the electronic pen is accommodated in the accommodation portion, the planar coil extending substantially in parallel to the axial direction of the electronic pen while the electronic pen is accommodated in the accommodation portion, and, in operation, a first number of magnetic fluxes, from among magnetic fluxes generated by the planar coil, interlinking in a first direction with the position indication coil of the electronic pen is not equal to a second number of magnetic fluxes, from among the magnetic fluxes generated by the planar coil, interlinking in a second direction with the position indication coil of the electronic pen, the first direction being opposite the second direction;
   a first control circuit which, in operation, performs control such that a supply process in which a first signal is supplied to the planar coil and a reception process in which a second signal is received through the planar coil by electromagnetic induction are performed alternately;
   a first detection circuit which, in operation, detects a state regarding accommodation of the electronic pen in the accommodation portion in accordance with a presence or an absence of the second signal received through the planar coil;
   a position detection sensor including a plurality of first loop coils disposed in a first direction and a plurality of second loop coils disposed in a second direction crossing the first direction and configured to detect a position indicated by the electronic pen in an operation region, the planar coil being disposed outside of the operation region in which the position indicated by the electronic pen is detectable by the position detection sensor;
   a second control circuit which, in operation, performs control to specify a first loop coil which is to transmit a third signal from among the plurality of first loop coils and the plurality of second loop coils and supply the third signal to the specified first loop coil, and specify a second loop coil which is to receive a fourth signal from among the plurality of first loop coils and the plurality of second loop coils and receive the fourth signal through the specified second loop coil; and
   a position detection control circuit which, in operation, controls, while the first detection circuit detects that the electronic pen is accommodated in the accommodation portion, at least the second control circuit to stop operating.

2. The position detection device according to claim 1, wherein the planar coil is disposed at a position at which only magnetic fluxes having same directions as each other, from among the generated magnetic fluxes, interlink with the position indication coil of the electronic pen while the electronic pen is accommodated in the accommodation portion.

3. The position detection device according to claim 1, wherein the planar coil is disposed, while the electronic pen is accommodated in the accommodation portion, at a position at which the center axis direction of the planar coil passes through at least part of the position indication coil of the electronic pen or another position at which the position indication coil of the electronic pen is displaced with respect to at least part of the planar coil.

4. The position detection device according to claim 1, further comprising:

a second detection circuit which, in operation, detects the position indicated by the electronic pen on the position detection sensor based on the fourth signal from the specified second loop coil.

5. The position detection device according to claim 4, wherein:
the first control circuit and the second control circuit are configured as one control circuit; and
the first detection circuit and the second detection circuit are configured as one detection circuit.

6. The position detection device according to claim 4, wherein:
the planar coil is formed using one of the plurality of first loop coils and the plurality of second loop coils of the position detection sensor;
the first control circuit and the second control circuit are configured as one control circuit; and
the first detection circuit and the second detection circuit are configured as one detection circuit.

7. The position detection device according to claim 1, wherein the planar coil is disposed on a flexible printed wiring board.

8. The position detection device according to claim 1, wherein a magnetic sheet is disposed on one side of the planar coil.

9. The position detection device according to claim 1, wherein an electromagnetic shield is provided on one side of the planar coil.

10. A control method for a position detection sensor which is used for a position detection device, the position detection device having a main body with a housing including an accommodation portion that accommodates therein an electronic pen having a position indication coil wound in an axial direction of the electronic pen, the housing of the main body of the position detection device enclosing the electronic pen while the electronic pen is accommodated in the accommodation portion, a planar coil having a rectangular cross-sectional area and disposed adjacent to the accommodation portion and disposed at a position at which a direction perpendicular to the rectangular cross-sectional area of the planar coil crosses the axial direction of the electronic pen while the electronic pen is accommodated in the accommodation portion, the planar coil extending substantially in parallel to the axial direction of the electronic pen while the electronic pen is accommodated in the accommodation portion, the planar coil having a rectangular cross-sectional area, the planar coil extending longitudinally in the axial direction of the electronic pen while the electronic pen is accommodated in the accommodation portion, and a first number of magnetic fluxes, from among magnetic fluxes generated by the planar coil, interlinking in a first direction with the position indication coil of the electronic pen is not equal to a second number of magnetic fluxes, from among the magnetic fluxes generated by the planar coil, interlinking in a second direction with the position indication coil of the electronic pen, the first direction being opposite the second direction, and the position detection sensor including a plurality of first loop coils disposed in a first direction and a plurality of second loop coils disposed in a second direction crossing the first direction and configured to detect a position indicated by the electronic pen in an operation region, the planar coil being disposed outside of the operation region in which the position indicated by the electronic pen is detectable by the position detection sensor, the control method comprising:

performing a first control process that includes alternately supplying a first signal to the planar coil and receiving a second signal through the planar coil by electromagnetic induction;
detecting a state regarding accommodation of the electronic pen in the accommodation portion in accordance with a presence or an absence of the second signal received through the planar coil extending substantially in parallel to the axis of the electronic pen while the electronic pen is accommodated in the accommodation portion;
performing a second control process that includes specifying a first loop coil which is to transmit a third signal from among the plurality of first loop coils and the plurality of second loop coils and supplying the third signal to the specified first loop coil, specifying a second loop coil which is to receive a fourth signal from among the plurality of first loop coils and the plurality of second loop coils, and receiving the fourth signal through the specified second loop coil;
detecting the position indicated by the electronic pen on the position detection sensor based on the fourth signal received through the specified second loop coil; and
controlling, while detecting that the electronic pen is accommodated in the accommodation portion, to not perform the second control process and the detecting of the position indicated by the electronic pen through the position detection sensor.

11. The position detection method according to claim 10, further comprising:
providing the planar coil adjacent to the accommodation portion at the position at which the center axis direction of the planar coil crosses the axial direction of the electronic pen while the electronic pen is accommodated in the accommodation portion, and a first number of magnetic fluxes, from among magnetic fluxes generated by the planar coil, interlinking with the position indication coil of the electronic pen in the first direction is not equal to the second number of magnetic fluxes, from among magnetic fluxes generated by the planar coil, interlinking with the position indication coil of the electronic pen in the second direction.

12. The position detection method according to claim 10, further comprising:
providing the planar coil at a position at which only magnetic fluxes having same directions as each other, from among the generated magnetic fluxes, interlink with the position indication coil of the electronic pen, while the electronic pen is accommodated in the accommodation portion.

13. The position detection method according to claim 10, further comprising:
providing the planar coil at a position at which the center axis direction of the planar coil passes through at least part of the position indication coil of the electronic pen or another position at which the position indication coil of the electronic pen is displaced with respect to at least part of the planar coil, while the electronic pen is accommodated in the accommodation portion.

14. The position detection method according to claim 10, wherein the planar coil is disposed on a flexible printed wiring board.

15. The position detection method according to claim 10, wherein a magnetic sheet is disposed on one side of the planar coil.

16. The position detection method according to claim 10, wherein an electromagnetic shield is provided on one side of the planar coil.

17. The position detection method according to claim 10, wherein the first and second loop coils are different from the planar coil.

18. The position detection device according to claim 1, wherein the first and second loop coils are different from the planar coil.

* * * * *

UNITED STATES PATENT AND TRADEMARK OFFICE
CERTIFICATE OF CORRECTION

PATENT NO. : 11,079,865 B2
APPLICATION NO. : 15/611373
DATED : August 3, 2021
INVENTOR(S) : Takeshi Kobori Page 1 of 1

It is certified that error appears in the above-identified patent and that said Letters Patent is hereby corrected as shown below:

On the Title Page

Page 2 item (56) References Cited/Foreign Patent Documents:
"WO 2015/079861 A1 6/2016" should read: --WO 2015/079861 A1 6/2015--.

Signed and Sealed this
Sixteenth Day of August, 2022

Katherine Kelly Vidal
*Director of the United States Patent and Trademark Office*